United States Patent
Sezer

(10) Patent No.: US 8,160,136 B2
(45) Date of Patent: Apr. 17, 2012

(54) PROBABILISTIC BIT-RATE AND RATE-DISTORTION COST ESTIMATION FOR VIDEO CODING

(75) Inventor: Osman Gokhan Sezer, Atlanta, GA (US)

(73) Assignee: Texas Instruments Incorporated, Dallas, TX (US)

( * ) Notice: Subject to any disclaimer, the term of this patent is extended or adjusted under 35 U.S.C. 154(b) by 484 days.

(21) Appl. No.: 12/537,868

(22) Filed: Aug. 7, 2009

(65) Prior Publication Data

US 2011/0032983 A1    Feb. 10, 2011

(51) Int. Cl.
*H04N 7/12* (2006.01)
*G06K 9/36* (2006.01)

(52) U.S. Cl. .................. 375/240.02; 382/232

(58) Field of Classification Search .......... 348/384, 348/387, 405, 419, 404, 403, 390, 406; 382/248, 382/239, 251, 250, 232, 253; 375/240.01–240.26
See application file for complete search history.

(56) References Cited

U.S. PATENT DOCUMENTS

| 6,167,162 A | 12/2000 | Jacquin et al. |
| 2009/0161757 A1 | 6/2009 | Yu et al. |

OTHER PUBLICATIONS

Kyeong Ho Yang, et al., "Normalised rate-distortion model for quantisation in MC-DCT video coders," Electronics Letters, pp. 2099-2100, vol. 33, No. 25, Dec. 4, 1997.

Zhihai He and Sanjit K. Mitra, "Optimum Bit Allocation and Accurate Rate Control for Video Coding via p-Domain Source Modeling," IEEE Transactions on Circuits and Systems for Video Technology, pp. 840-849, vol. 12, No. 10, Oct. 2002.

Jennifer L.H. Webb and Karen Oehler, "A Simple Rate-Distortion Model, Parameter Estimation, and Application to Real-Time Rate Control for DCT-Based Coders," IEEE Conference Proceeding, International Conference on Image Processing, vol. 2, pp. 13-16, Oct. 1997.

*Primary Examiner* — Behrooz Senfi
(74) *Attorney, Agent, or Firm* — Mima Abyad; Wade J. Brady, III; Frederick J. Telecky, Jr.

(57) ABSTRACT

A method of video encoding is provided that includes computing spatial variance for video data in a block of a video sequence, estimating a first bit-rate based on the spatial variance, a transform coefficient threshold, and variance multiplicative factors empirically determined for first transform coefficients, and encoding the block based on the first bit-rate.

18 Claims, 14 Drawing Sheets

PROBABILISTIC BIT-RATE AND RATE-DISTORTION COST ESTIMATION FOR VIDEO CODING

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. Typically codecs are industry standards such as MPEG-2, MPEG-4, H.264/AVC, etc. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block.

Many block motion compensation schemes basically assume that between successive pictures, i.e., frames, in a video sequence, an object in a scene undergoes a displacement in the x- and y-directions and these displacements define the components of a motion vector. Thus, an object in one picture can be predicted from the object in a prior picture by using the motion vector of the object. To track visual differences from frame-to-frame, each frame is tiled into blocks often referred to as macroblocks. Block-based motion estimation algorithms are used to generate a set of vectors to describe block motion flow between frames, thereby constructing a motion-compensated prediction of a frame. The vectors are determined using block-matching procedures that try to identify the most similar blocks in the current frame with those that have already been encoded in prior frames.

Many video codecs (e.g., H.264 video codecs) select from among a variety of coding modes to encode video data as efficiently as possible. In many instances, the best compression mode for a macroblock is determined by selecting the mode with the best compression performance, i.e., with the minimum rate-distortion (R-D) cost:

$$\text{Cost} = \text{Distortion}_{Mode} + \lambda \cdot \text{Rate}_{Mode}. \quad (1)$$

where $\lambda$ is the Lagrangian multiplier, $\text{Rate}_{Mode}$ is the bit-rate of a mode, and $\text{Distortion}_{Mode}$ is the distortion (loss of image quality) for a mode. An accurate R-D cost may be obtained by actually coding a macroblock in all the modes and using information from the coding process to determine the distortion and bit-rate. For example, to determine the bit-rate of a macroblock encoded using a particular mode, the transform of the data in the macroblock is taken, the transformed data is quantized, and then the quantized data is entropy coded find the bit rate. However, determination of bit-rates in this manner is computationally complex and may not be suitable for use in real-time video applications with low-power encoders and limited computation resources such as cellular telephones, video cameras, etc.

To reduce the complexity of determining the bit-rate, techniques for estimating the bit-rate are used. Some known techniques are based on the direct correlation between the spatial information of the data in a macroblock, which is fairly easy to extract, and the actual number of bits required to compress the data. In general, in these techniques, the spatial information of the data and actual bit-rate of the data is modeled by fitting curves in an offline training stage for various quantization parameters and video contents. Finding a one-to-one mapping that yields the bit-rate of the data for the given spatial information may be difficult. Further, even if such a curve is approximated, the curve is dependent on the content of training data which may hinder the generalization of the extracted relationship between the bit-rate and the spatial information to actual data. Other known bit-rate estimation techniques rely on taking the transform of the data in a macroblock and counting the number of non-zero coefficients in the transform domain after applying dead-zone quantization. However, in some applications, even taking the transform and counting the number of non-zero coefficients after quantization can be computationally costly. Accordingly, improvements in bit-rate estimation and rate-distortion cost estimation that further reduce the computational complexity are desirable for real-time, low-power video applications.

SUMMARY OF THE INVENTION

In general, in one aspect, the invention relates to a method of video encoding that includes computing spatial variance for video data in a block of a video sequence, estimating a first bit-rate based on the spatial variance, a transform coefficient threshold, and variance multiplicative factors empirically determined for first transform coefficients, and encoding the block based on the first bit-rate.

In general, in one aspect, the invention relates to digital system that includes a video encoder configured to encode a block of a video sequence by computing spatial variance for video data in a block of a video sequence, estimating a first bit-rate based on the spatial variance, a transform coefficient threshold, and variance multiplicative factors empirically determined for first transform coefficients, and encoding the block based on the first bit-rate.

In general, in one aspect, the invention relates to a computer readable medium that includes executable instructions to cause a digital system to perform a method of video encoding that includes computing spatial variance for video data in a block of a video sequence, estimating a first bit-rate based on the spatial variance, a transform coefficient threshold, and variance multiplicative factors empirically determined for first transform coefficients, and encoding the block based on the first bit-rate.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
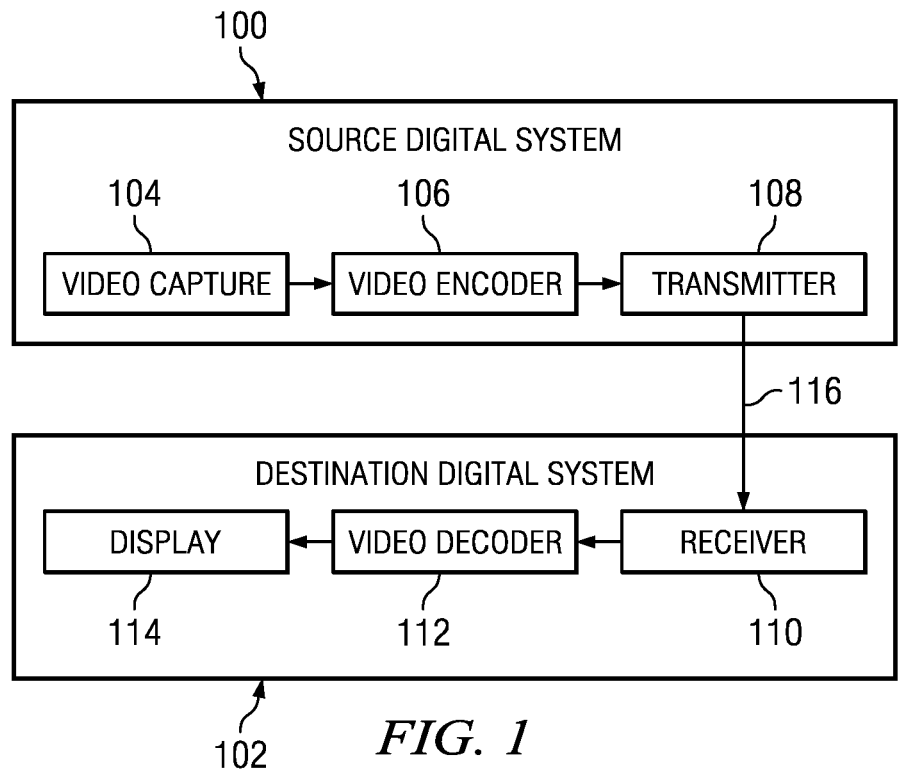
FIG. 1 shows a block diagram of a video encoding/decoding system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while various embodiments of the invention are described herein in accordance with the H.264 video coding standard, embodiments for other video coding standards will be understood by one of ordinary skill in the art. Accordingly, embodiments of the invention should not be considered limited to the H.264 video coding standard.

In general, embodiments of the invention provide for low-complexity probabilistic bit-rate estimation and/or probabilistic rate-distortion cost estimation in video encoding with a good level of accuracy. Embodiments of the bit-rate estimation method and the rate-distortion cost estimation method described herein combine the estimation accuracy of the prior art transform domain estimation methods with the lower complexity of using spatial domain information such that a single one-to-one mapping between the number of bits spent to encode video data and the spatial information of the uncompressed video data can be found. More specifically, bit-rate estimates and/or rate-distortion cost estimates for a block of video data may be computed using spatial information of the video data, transform coefficient thresholds, and empirically derived multiplicative factors.

FIG. 1 shows a block diagram of a video encoding/decoding system in accordance with one or more embodiments of the invention. The video encoding/decoding system performs encoding of digital video sequences using embodiments of the methods for bit-rate estimation and rate-distortion (R-D) cost estimation described herein. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of video frames, divides the frames into coding units which may be a whole frame or a slice of a frame, divides the coding units into blocks of pixels, and encodes the video data in the coding units based on these blocks. During the encoding process, a method for bit-rate estimation and/or a method for R-D cost estimation in accordance with one or more of the embodiments described herein is used. The functionality of embodiments of the video encoder component (106) is described in more detail below in reference to FIG. 2.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110)

receives the encoded video data from the source digital system (100) via the communication channel (116) and provides the encoded video data to the video decoder component (112) for decoding. In general, the video decoder component (112) reverses the encoding process performed by the video encoder component (106) to reconstruct the frames of the video sequence. The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony. Further, the video encoder component (106) and the video decoder component (112) perform encoding and decoding in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), etc.

Figure 2:
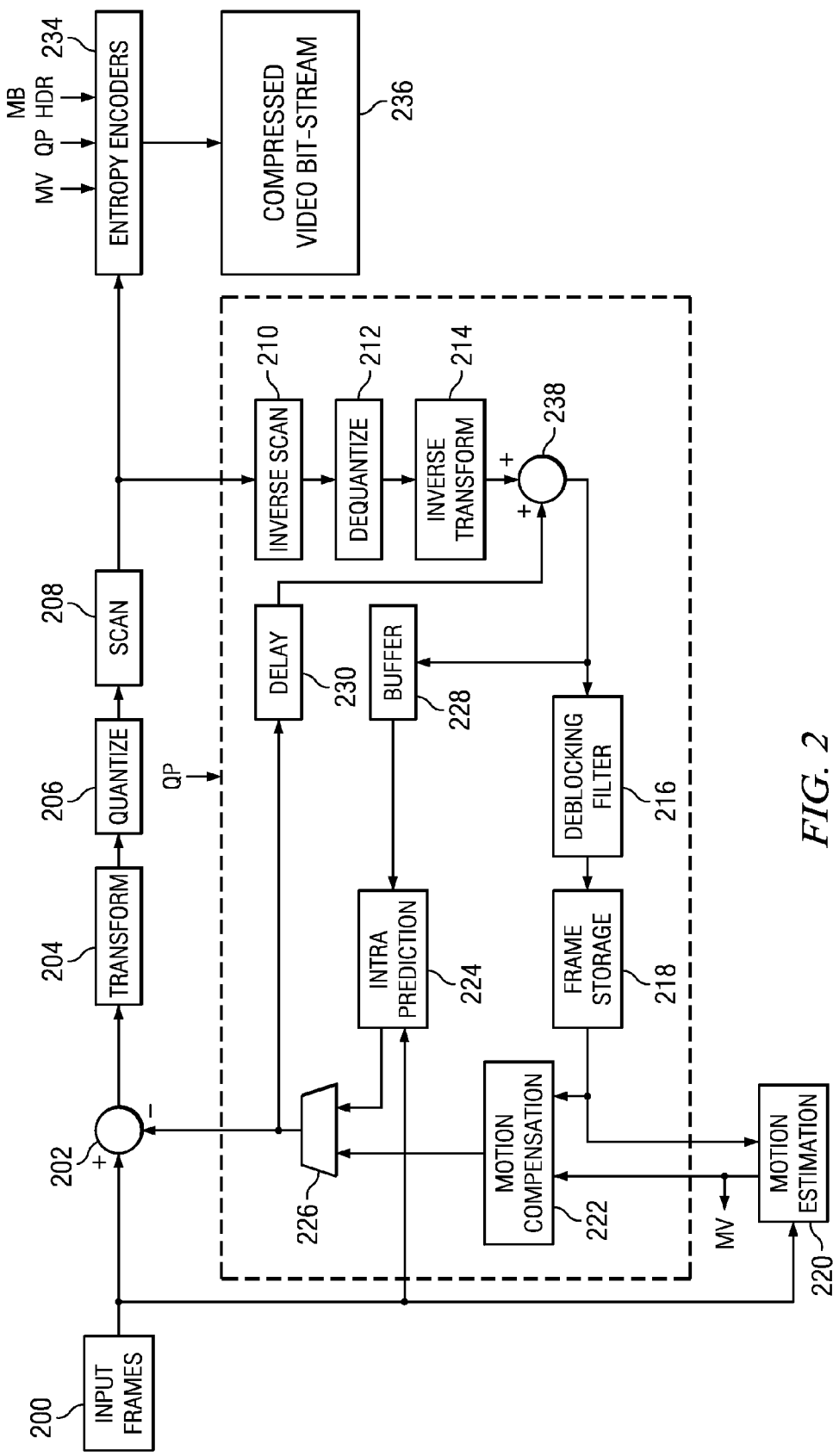
FIG. 2 shows a block diagram of a video encoder in accordance with one or more embodiments of the invention.

FIG. 2 shows a block diagram of a video encoder, e.g., the video encoder (106) in accordance with one or more embodiments of the invention. More specifically, FIG. 2 illustrates the basic coding architecture of an H.264 encoder. A method for bit-rate estimation and/or a method for R-D cost estimation in accordance with one or more of the embodiments described herein may be used for mode selection by the motion estimation component (220).

In the video encoder of FIG. 2, input frames (200) for encoding are provided as one input of a motion estimation component (220), as one input of an intraframe prediction component (224), and to a positive input of a combiner (202) (e.g., adder or subtractor or the like). The frame storage component (218) provides reference data to the motion estimation component (220) and to the motion compensation component (222). The reference data may include one or more previously encoded and decoded frames. The motion estimation component (220) provides motion estimation information to the motion compensation component (222) and the entropy encoders (234). More specifically, the motion estimation component (220) performs tests based on the prediction modes defined in the H.264 standard to choose the best motion vector(s)/prediction mode. The motion estimation component (220) provides the selected motion vector (MV) or vectors and the selected prediction mode to the motion compensation component (222) and the selected motion vector (MV) to the entropy encoders (234).

The motion compensation component (222) provides motion compensated prediction information to a selector switch (226) that includes motion compensated interframe prediction macroblocks (MBs). The intraframe prediction component also provides intraframe prediction information to switch (226) that includes intraframe prediction MBs and a prediction mode. That is, similar to the motion estimation component (220), the intraframe prediction component performs tests based on prediction modes defined in the H.264 standard to choose the best prediction mode for generating the intraframe prediction MBs.

The switch (226) selects between the motion-compensated interframe prediction MBs from the motion compensation component (222) and the intraframe prediction MBs from the intraprediction component (224) based on the selected prediction mode. The output of the switch (226) (i.e., the selected prediction MB) is provided to a negative input of the combiner (202) and to a delay component (230). The output of the delay component (230) is provided to another combiner (i.e., an adder) (238). The combiner (202) subtracts the selected prediction MB from the current MB of the current input frame to provide a residual MB to the transform component (204). The resulting residual MB is a set of pixel difference values that quantify differences between pixel values of the original MB and the prediction MB. The transform component (204) performs a block transform such as DCT, on the residual MB to convert the residual pixel values to transform coefficients and outputs the transform coefficients.

The transform coefficients are provided to a quantization component (206) which outputs quantized transform coefficients. Because the DCT transform redistributes the energy of the residual signal into the frequency domain, the quantized transform coefficients are taken out of their raster-scan ordering and arranged by significance, generally beginning with the more significant coefficients followed by the less significant by a scan component (208). The ordered quantized transform coefficients provided via a scan component (208) are coded by the entropy encoder (234), which provides a compressed bitstream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, the ordered quantized transform coefficients provided via the scan component (208) are returned to their original post-DCT arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual MB. The reconstructed residual MB is provided to the combiner (238). The combiner (238) adds the delayed selected predicted MB to the reconstructed residual MB to generate an unfiltered reconstructed MB, which becomes part of reconstructed frame information. The reconstructed frame information is provided via a buffer (228) to the intraframe prediction component (224) and to a filter component (216). The filter component (216) is a deblocking filter (e.g., per the H.264 specification) which filters the reconstructed frame information and provides filtered reconstructed frames to frame storage component (218).

Methods for probabilistic bit-rate estimation and probabilistic rate-distortion (R-D) cost estimation that may be used in video encoding are now be described in reference to FIGS. 3-9. In general, these methods use just spatial information by generating a model based on a relationship between spatial domain and transform domain information to estimate a bit-rate for a block of video data and/or to estimate an R-D cost for a macroblock. As previously mentioned, prior art bit-rate estimation methods that use spatial information of a block/macroblock/frame reduce the computational complexity of determining a bit-rate. These spatial domain methods use relatively simple methods for extracting spatial information of the video data in a macroblock, such as, for example, the Sum of Absolute Difference (SAD) from the motion estimation process, the variance of the video data, or the mean of the video data. However, experiments show that there are many cases in which the actual bit-rate of the video data and the extracted spatial information for the video data do not have sufficient correlation to be modeled with a single curve. Further, even when there is a correlation, many curves are needed to represent the relationship between the actual bit-rate and the spatial information for various quantization values and varying video/image content.

Also as previously mentioned, prior art bit-rate estimation methods that use transform domain information rely on taking the transform of the video signal. For example, the prior art rho-domain bit-rate estimation method estimates the compression performance of a video coder by counting the number of non-zero coefficients after dead-zone quantization. Eq. (2) summarizes how the rho-domain method estimates the number of bits for a macroblock/block/frame.

$$R = \phi(1-\rho) \quad (2)$$

where R is the estimated bit-rate, $\rho$ is the ratio of the number of zero quantized transform coefficients to the total number of transform coefficients for a particular transform, and $\phi$ is an adaptation parameter that scales the ratio to match with the actual bit-rate. The rho-domain method yields a relatively accurate bit-rate estimate but it does require the application of transforms to the video data and quantization of the resulting transform coefficients. This may not be desirable for limited resource applications as performing the needed transforms and quantization can be computationally expensive.

Figure 3A:
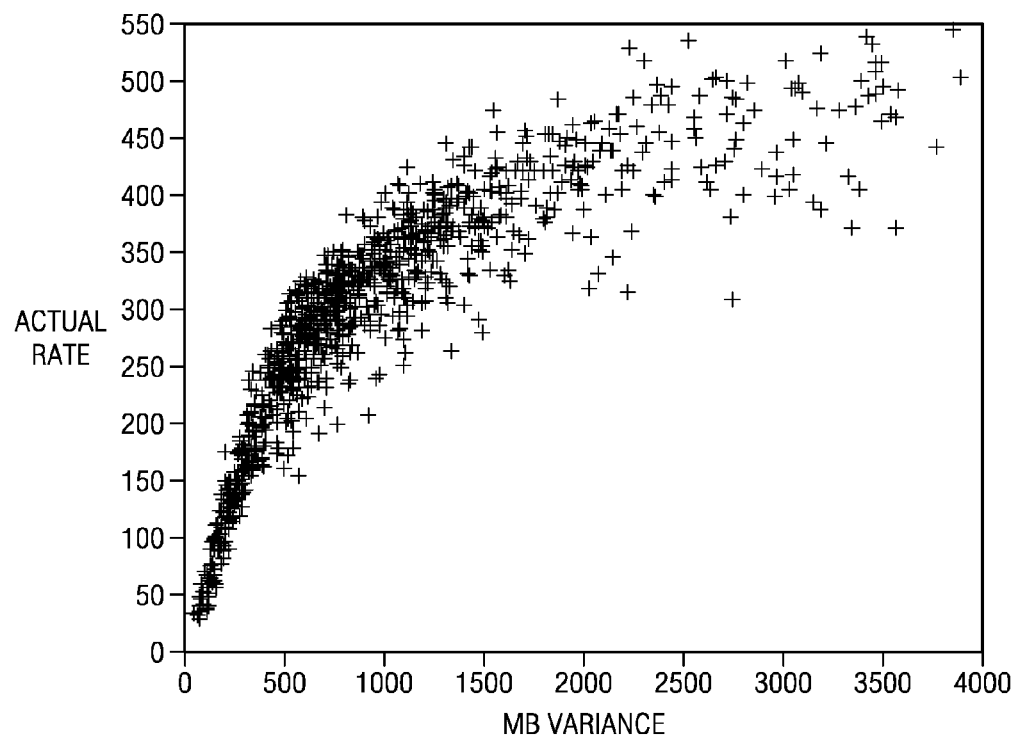
FIGS. 3A and 3B show graphs in accordance with one or more embodiments of the invention.
Figure 3B:
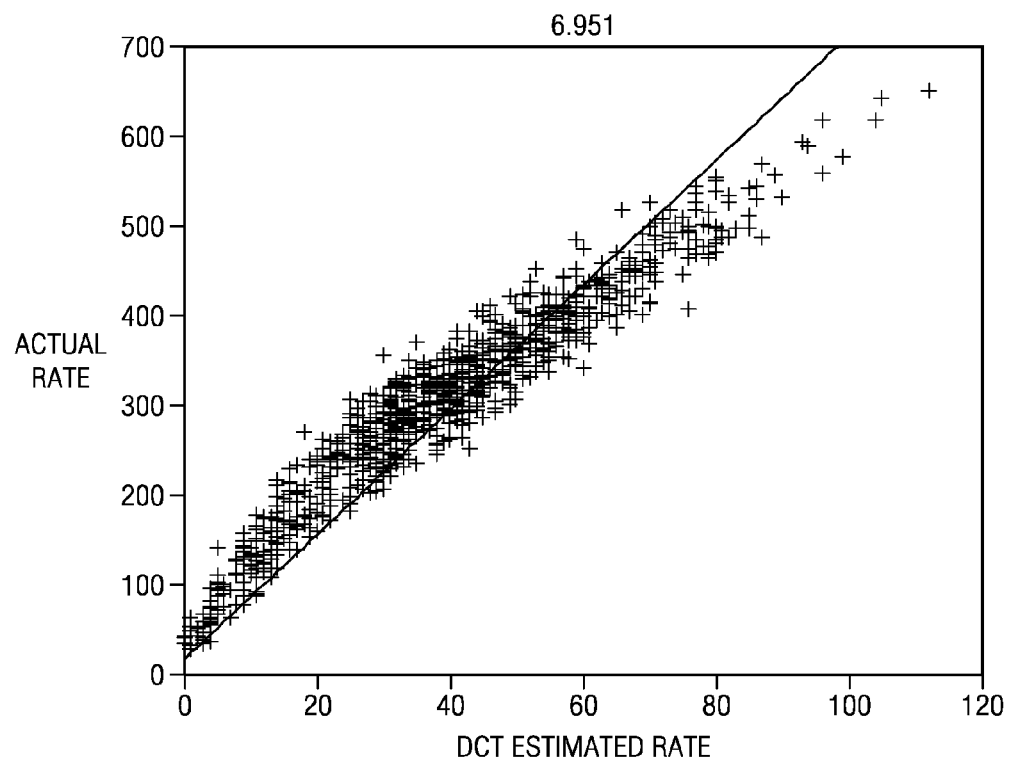

FIG. 3A shows a graph of the correlation between the actual bit-rate and the spatial variance of macroblocks obtained from a video sequence. FIG. 3B shows the correlation between the number of non-zero transform coefficients and the actual bit-rate of the macroblocks in the same video sequence. Note that FIG. 3B shows an almost linear relationship between the actual bit-rate and the number of non-zero transform coefficients.

Figure 4A:
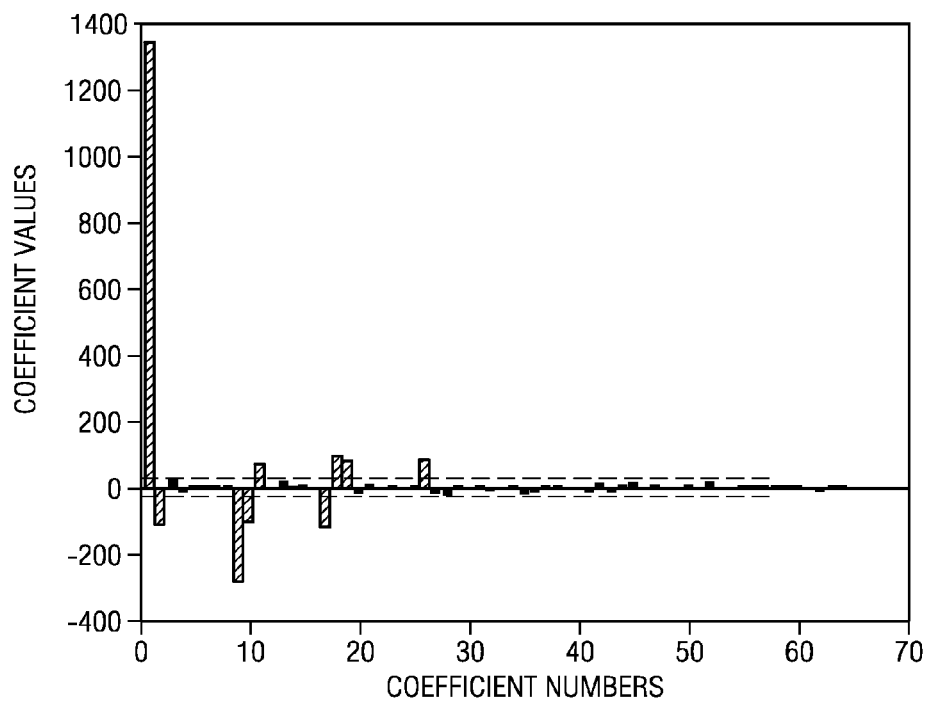
FIGS. 4A-4D show, respectively, a graph of results of an example DCT transform and histograms of transform coefficients in accordance with one or more embodiments of the invention.

The bit-rate estimation method and the R-D cost estimation method described herein are based on insight from transform domain analysis but do not require actually computing the transforms and performing the quantization. The prior art transform domain bit-rate estimation methods transform the video data and perform dead-zone quantization to determine how many of the transform coefficients are above some given threshold (e.g., quantization level). FIG. 4A shows a graph of the results of transforming and quantizing an 8×8 block with an 8×8 Discrete-Cosine-Transform (DCT). This graph shows that the number of transform coefficients above the threshold value T, T=50 for this example, is 9. Having this number is sufficient to deduce the number of bits required to encode the block. Note that all that is really needed is the number of transform coefficients above the threshold and not the actual values of the transform coefficients.

Figure 4B:
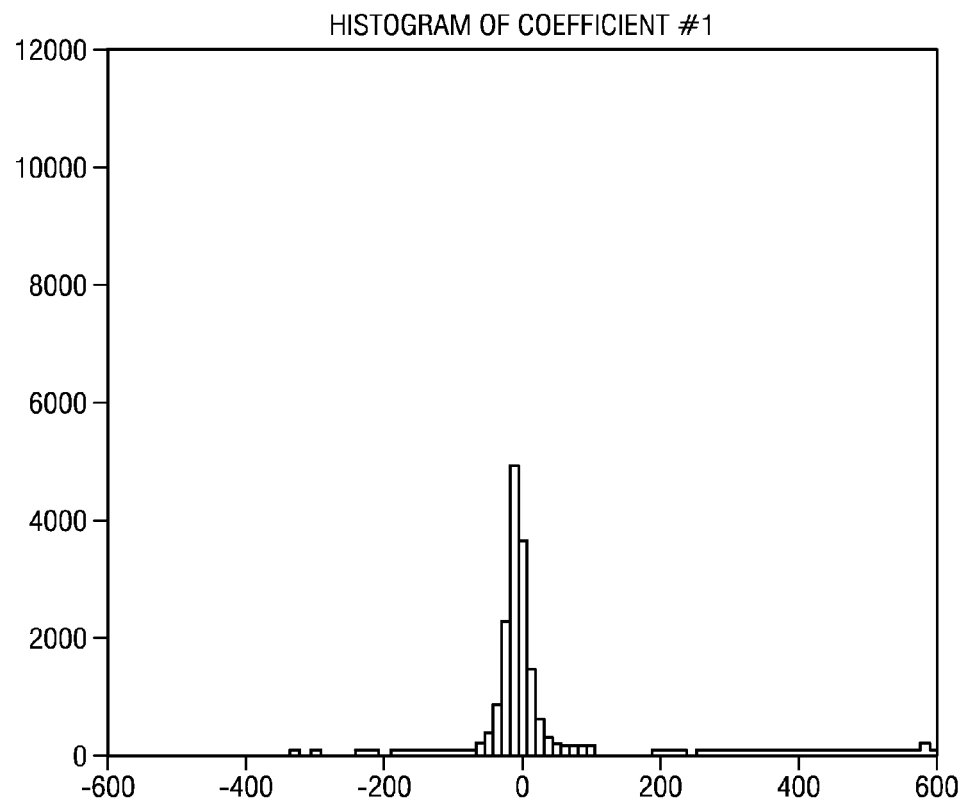
Figure 4C:
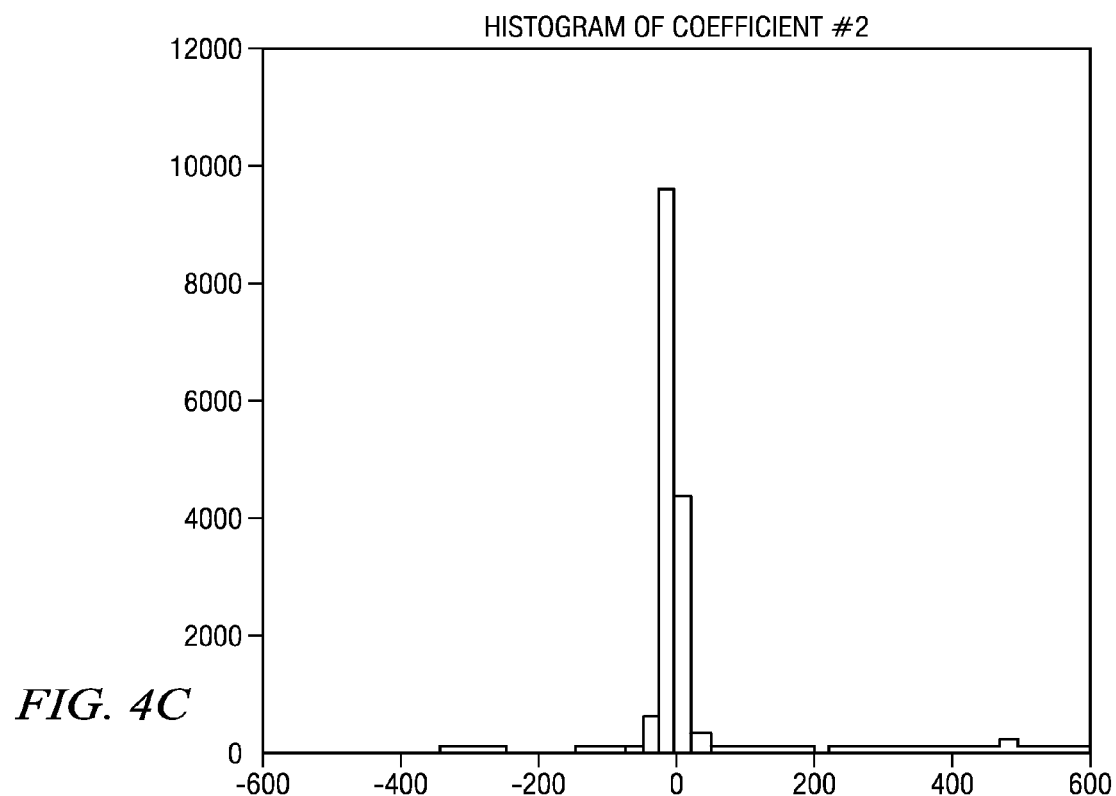
Figure 4D:
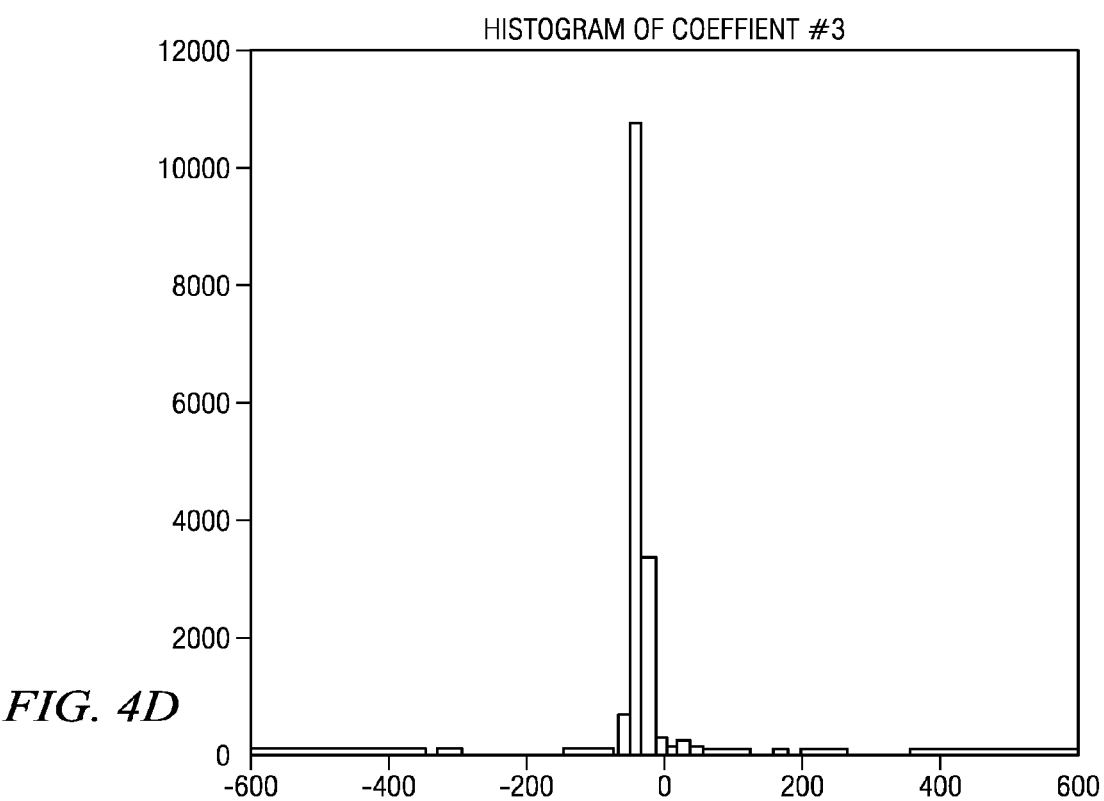

The methods described herein use statistical means to determine the number of non-zero transform coefficients by building a statistical model for the applied transform. The insight to use a statistical model can be found in the histograms of the first three transform coefficients of a DCT transform as shown in FIGS. 4B-4D. The histograms of these three transform coefficients are extracted from a training video. The x-axis of the histograms denotes the transform coefficient values and y-axis denotes the number of occurrences of that particular transform coefficient value. These histograms illustrate that a majority of the time the coefficients of the DCT have zero value and overall there is an exponential function shape for individual distribution of occurrences.

Thus, the distribution of each transform coefficient can be modeled with a generalized exponential distribution. For purposes of illustration, the assumption is made that the transform coefficients have Laplacian distribution. However, one of ordinary skill in the art will know that other distributions may also be used, such as a Gaussian distribution. Using the assumption of the Laplacian distribution, the distribution of a transform coefficient may be modeled as shown in Eq. (3).

$$p(c \mid \mu, \sigma) = \frac{1}{\sqrt{2}\,\sigma} \exp\left(-\frac{\sqrt{2}\,|c-\mu|}{\sigma}\right) \quad (3)$$

where c is the transform coefficient value, $\sigma$ is the variance of the transform coefficient, and $\mu$ is the mean of the distribution. For purposes of description herein, the mean is assumed to be zero but this assumption can be modified depending on the nature of the video data. With this assumption, the variance is the only parameter that defines the distribution of a transform coefficient. Thus, if the variance of each transform coefficient is known, the probability of each transform coefficient being non-zero can be determined as shown in Eq. (4).

$$\text{Probability of non-zero} = p(|c_i| > T) = 2 \times p(c_i > T) \quad (4)$$

where $c_i$ is the value of the ith transform coefficient.

Figure 5A:
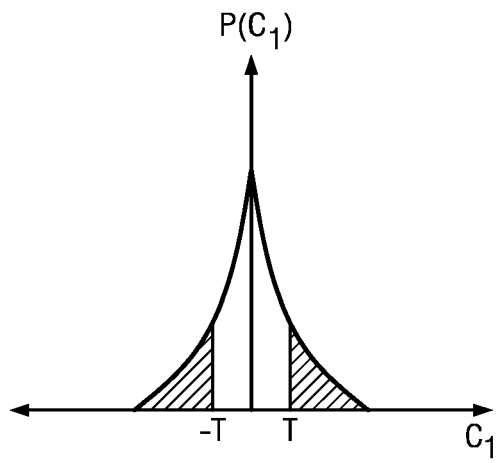
FIGS. 5A and 5B show example transform coefficient distributions in accordance with one or more embodiments of the invention.
Figure 5B:
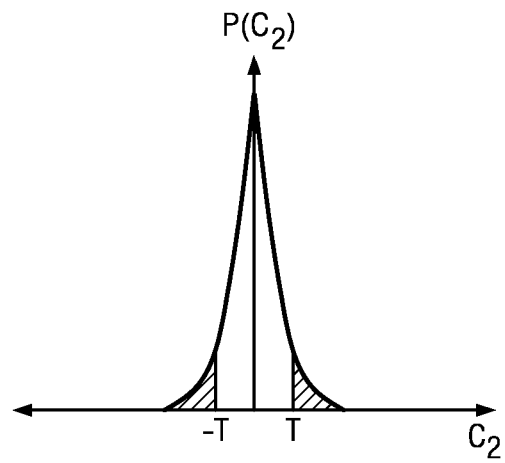

Using cumulative distribution function, Eq. (4) can be rewritten as shown in Eq. (5).

$$\text{Probability of non-zero} = 2 \times F_i(T) = \exp\left(-\frac{\sqrt{2}\,T}{\sigma_{c_i}}\right) \quad (5)$$

where $F_i$ is the cumulative distribution function of the ith transform coefficient and $\sigma_{c_i}$ is the variance of ith transform coefficient. FIGS. 5A and 5B show examples of the distribution functions of two transform coefficients that have different variances. The shaded regions beneath the distribution functions show the probability of the coefficient being non-zero for given T value, i.e., quantization threshold value. Note that transform coefficient $c_1$ has higher variance and is thus more likely to be non-zero than transform coefficient $c_2$.

Based on the probability of each transform coefficient being non-zero, a probabilistic description for the total number of transform coefficients that are above the threshold value, i.e., a probabilistic bit-rate, is given in Eq. (6).

$$\text{probabilistic bit-rate} = 2 \times \sum_i F_i(T) = \sum_i \exp\left(-\frac{\sqrt{2}\,T}{\sigma_{c_i}}\right) \quad (6)$$

In essence, Eq. (6) sums the expression given in Eq. 5 for all the coefficients of the transform. The only parameters needed to calculate the probabilistic bit-rate are the variances of the coefficients of the transform $\sigma_{C_i}$. The variances of the transform coefficients may be found based on the correlation between the variance of the original uncompressed video data, i.e., the spatial variance, and the variance of the transform coefficients. FIG. 5 shows graphs of the correlation of the spatial variance of macroblocks vs. the variance of the coefficients of a 4×4 DCT transform. The graphs are shown in raster-scan order. As can be seen from FIG. 6, the correlation can be modeled by a linear regression. At the top of each graph in FIG. 6, the slope of the fitted line is given.

Figure 6:
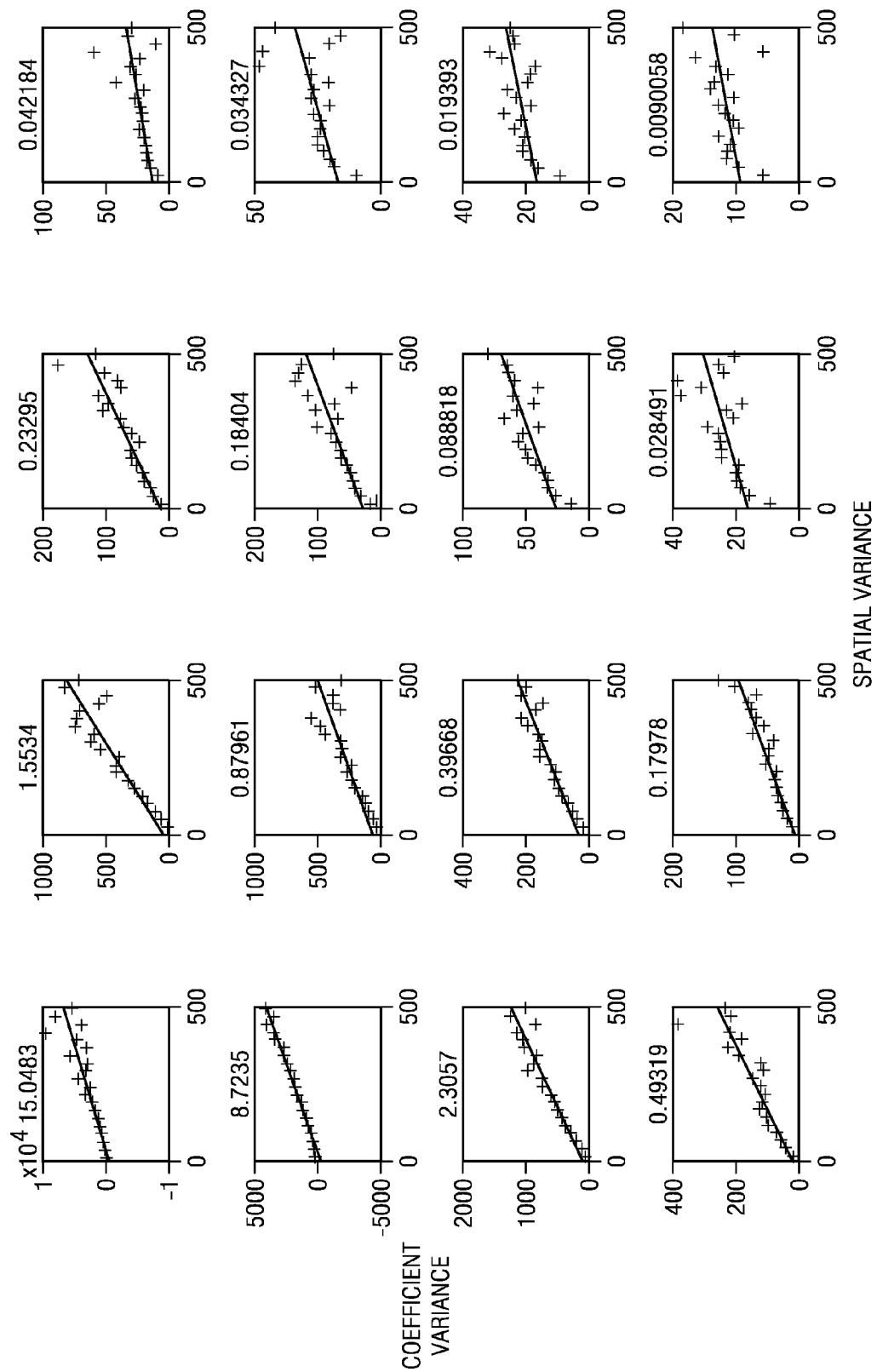
FIG. 6 shows graphs of spatial variance versus transform coefficient variance in accordance with one or more embodiments of the invention.

This correlation shows that the variance of the transform coefficients can be determined based on the spatial variance of the uncompressed video data. Without loss of generality, the variance of the coefficients of the transform may be estimated from the spatial variance as shown in Eq. (7).

$$\sigma_{C_i}^2 = k_i \sigma_{spatial}^2 \qquad (7)$$

where $\sigma_{spatial}^2$ is the spatial variance of the block or macroblock, and $k_i$ is a variance multiplicative factor that can be found by training as shown in FIG. 6. Note that the variance multiplicative factors $k_i$ for the example of FIG. 6 are the slopes of the fitted lines, e.g., $k_1$=15.04, $k_2$=1.55, ..., $k_{16}$=0.009. These example $k_i$ values are for intra-coded blocks using a 4×4 DCT transform. A similar approach is used for other coding modes to find the correlation between the spatial variance and the transform coefficient variance to determine the variance multiplicative factors for those modes. Further, more complicated data fitting methods may be used to determine the variance multiplicative factors. In some embodiments of the invention, the $k_i$ are periodically updated as a video sequence is encoded.

Integrating Eq. (7) into Eq. (6), the expression for the probabilistic bit-rate becomes as shown in Eq. (8).

$$\text{probabilistic bit-rate} = \sum_i \exp\left(-\frac{\sqrt{2}\,T}{k_i \sigma_{spatial}}\right) \qquad (8)$$

If T and the $k_i$ are defined as constants for the entire video sequence, Eq. (8) can be rewritten as Eq. (9).

$$\text{probabilistic bit-rate} = \sum_i \exp\left(-\frac{\sqrt{2}\,T_i}{\sigma_{spatial}}\right) \qquad (9)$$

where $T_i$=T/$k_i$. The expression in Eq. (9) is a probability and needs to be translated into a number of bits, i.e., a bit-rate.

To achieve this translation, the expected number of bits for a given block/macroblock/frame is needed. This number can be estimated by finding the average number of bits spent to encode each transform coefficient in offline training. Then, the estimated bit-rate may be determined as shown in Eq. (10).

$$\text{estimated bit-rate} = \sum_i b_i \times \exp\left(-\frac{\sqrt{2}\,T_i}{\sigma_{spatial}}\right) \qquad (10)$$

where $b_i$ is the average number of bits spent to encode ith transform coefficient. The expression of Eq. (10) can be further simplified by assuming a fixed bit budget, $\phi$, for each transform coefficient. The bit budget $\phi$ may be empirically determined, for example, by running a training algorithm that produces both actual bit-rates and estimated bit-rates using the probabilistic bit-rate method described herein. The ratio between average value of the actual bit-rates and the average value of the estimated bit-rates provides the bit budget $\phi$.

With the assumption of a fixed bit budget, the formulation for the estimated bit-rate is given by Eq. (11).

$$\text{estimated bit-rate} = \varphi \times \sum_i \exp\left(-\frac{\sqrt{2}\,T_i}{\sigma_{spatial}}\right) \qquad (11)$$

In some embodiments of the invention, the value of $\phi$ is fixed throughout the entire encoding process. In one or more embodiments of the invention, $\phi$ is assumed to be 7. In one or more embodiments of the invention, an adaptation scheme that looks at the previously encoded data to update $\phi$ is used. Further, the updating of $\phi$ may be done periodically, such as for example, in each frame, after a certain number of macroblocks is encoded, etc. In addition, in some embodiments, different $\phi$ values may be used for different coding strategies. Note that if $\phi$ and $T_i$ are fixed, the only parameter that determines the bit-rate is the spatial variance. In one or more embodiments of the invention, rather than computing the estimated bit-rate as shown in Eq. (11), only the spatial variance is computed and a table look-up using the spatial variance and the transform coefficient threshold, i.e., the quantization threshold may be performed to find the estimated bit-rate. More specifically, if the values of $\phi$ and T are assumed to be fixed, estimated bit-rates for the possible range of spatial variance values can be precomputed as per Eq. (11) and the values provided in a look-up table.

In the application of Eq. (11) to estimate the bit-rate, a possible corner case can occur when the mean of the spatial data deviates widely from zero. Such an occurrence may affect the $1^{st}$ (or DC) coefficient and in general will not affect the bit-rate estimation significantly if the spatial variance of the video data is high. However, in cases where the mean of the video data is high and the spatial variance is low, the 1st transform coefficient may dominate the representation and the zero-mean assumption used after Eq. (3) will affect the accuracy of the bit-rate estimation. In some embodiments of the invention, such cases are handled separately. One solution is to use the absolute value of the mean of the video data as the estimated bit-rate. It is well known that $1^{st}$ (or DC) coefficient in an actual DCT transform captures the mean of the video data. Thus, switching from the probabilistic model for determining the estimated bit-rate to using the absolute mean as the estimated bit-rate improves the bit-rate estimation for such cases. Thus, in some embodiments of the invention, the bit-rate estimation method is given by Eq. (12).

$$\text{estimated bit-rate} = \qquad (12)$$
$$\begin{cases} \rho|\mu_{spatial}|, & |\mu_{spatial}| > m,\ \sigma_{spatial} < v \\ \varphi \times \sum_i \exp\left(-\frac{\sqrt{2}\,T_i}{\sigma_{spatial}}\right), & \text{otherwise} \end{cases}$$

where $\mu_{spatial}$ is the mean of the uncompressed video data, m is an experimentally determined threshold mean value, v is an experimentally threshold variance value, and $\rho$ is an experimentally determined multiplication factor for scaling the absolute mean to the bit rate. In one or more embodiments of the invention, m=7, v=100 and ρ=2.

Figure 7:
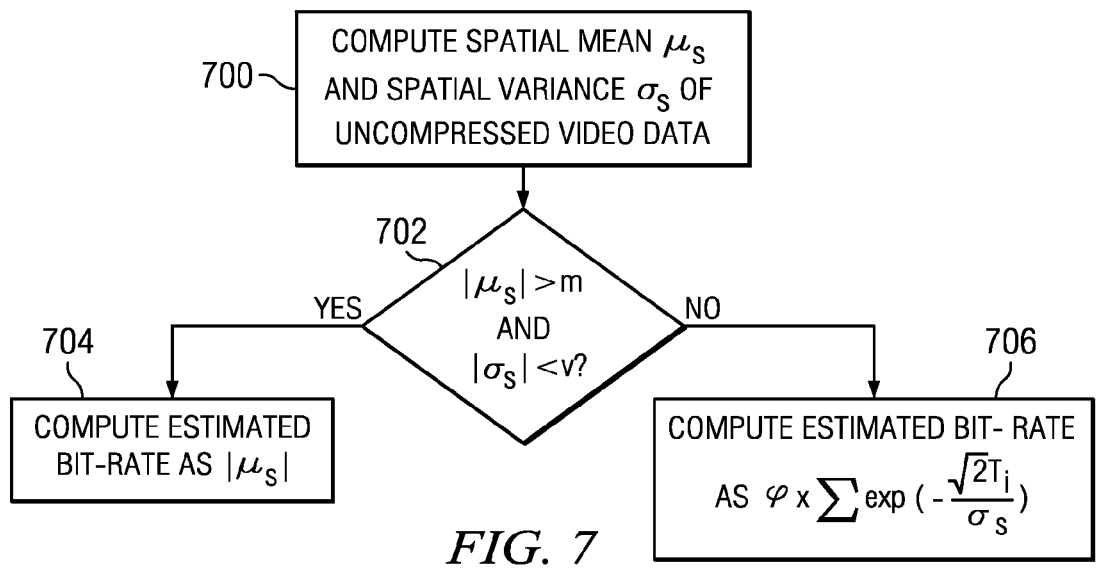
FIG. 7 shows a flow diagram of a method for bit-rate estimation in accordance with one or more embodiments of the invention.

FIG. 7 shows a flow diagram of a method for estimating a bit-rate for a block of video data in accordance with one or more embodiments of the invention. The block of video data may be a frame, a macroblock, or any other partitioning of the video data. Initially, the spatial mean $\mu_s$ and spatial variance $\sigma_s$ of uncompressed video data in the block are computed (700). The spatial variance and spatial mean may be computed using any acceptable method for computing spatial variance and spatial mean, such as, for example, $$\text{sample variance} \equiv \sigma_x = \left\{ \frac{1}{N-1} \sum_{i=1}^{N} (x_i - \mu_x)^2 \right\}$$

$$\text{mean} \equiv \mu_x = \frac{1}{N} \sum_{i=1}^{N} x_i$$

If the absolute value of the spatial mean $\mu_s$ is greater than an empirically determined spatial mean threshold value m and the spatial variance $\sigma_s$ is less than an empirically determined spatial variance threshold value v (702), then the estimated bit-rate is computed as the absolute value of the spatial mean $\mu_s$ (704) scaled by an empirically determined multiplication factor. Otherwise, the estimated bit rate is computed as per Eq. (11) (706).

Following a similar probabilistic approach, the rate-distortion cost for a block may be jointly estimated. As was previously discussed, a video encoder, e.g., an H.264 video encoder, may select the best encoding mode for a block of video data by finding the mode that has the minimum rate-distortion cost. In the prior art, this rate-distortion cost may have been determined using SAD or by taking the Hadamard transform of the video data and calculating the SAD of the transform coefficients, referred to as the sum of absolute transform difference (SATD).

To calculate rate-distortion cost, a non-linear approximation approach as shown is Eq. (13) is taken.

$$\text{Rate-Distortion Cost} \approx \|x - D\hat{c}\|_2^2 + \lambda \|\hat{c}\|_0 \qquad (13)$$

where D is the transform (e.g., DCT), c is the transform coefficient of video data x extracted with transform D, λ is the Lagrangian multiplier, and ĉ is the quantized transform coefficient after application of a uniform dead-zone quantizer of step size T. The term to the left of the plus sign in Eq. (13) accounts for the distortion measure in L2 norm and the term to the right of the plus sign accounts for the bit-rate measure in L0 norm of ĉ which denotes the number of nonzero entries in the ĉ coefficient vector.

$$L2 \text{ norm} \equiv \|x\|_2 = \left( \sum_{i=1}^{N} x_i^2 \right)^{1/2}$$

$$L0 \text{ norm} \equiv \|x\|_0 = \{\# \text{ of } x_j's \,|\, x_j > 0\}$$

As previously discussed, the number of nonzero transform coefficients of the video data yields a good approximation of the number of bits required to encode that data.

With the assumption that distortion is dominated by the transform coefficients that are zeroed out in the quantization, the Lagrangian multiplier λ is equal to the square of the quantization level (or dead zone level) T and Eq. (13) may be rewritten as Eq. (14).

$$\text{Rate-Distortion Cost} \approx \|x - D\hat{c}\|_2^2 + T^2 \|\hat{c}\|_0. \qquad (14)$$

The contribution of each transform coefficient of vector c, $RD(c_i)$, to the rate-distortion cost may be modeled as shown in Eq. (15).

$$RD(c_i) = \begin{cases} T^2, & |c_i| > T \\ c_i^2, & |c_i| < T \end{cases} \qquad (15)$$

Further, summation over all transform coefficients of the vector c gives the overall rate-distortion cost as shown in Eq. (16).

$$\text{Rate-Distortion Cost} = \sum_{\forall i} RD(c_i). \qquad (16)$$

Figure 8:
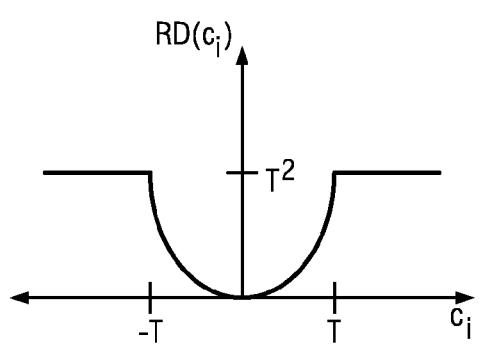
FIG. 8 shows a graph of a rate-distortion cost function for one transform coefficient in accordance with one or more embodiments of the invention.

FIG. 8 shows a graph of the contribution of a single transform coefficient to the overall rate-distortion cost as a function of the transform coefficient value.

To estimate rate-distortion cost of some video data x from its spatial information, a probabilistic approach similar to that described above for estimating bit-rate is used. The bit-rate model uses the relationship between the spatial variance of video data and the variance of the transform coefficients to estimate the required number of bits to encode the video data. Since the spatial variance is the only parameter needed to define a zero-mean Laplacian distribution, the distribution of each transform coefficient can be obtained. Using the distributions of the transform coefficients and a given quantization level T, the contribution of a transform coefficient to the rate-distortion cost for may be estimated as shown in Eq. (17) by multiplying the probability distribution of the transform coefficient with the cost function shown in FIG. 8.

$$\text{Prob. } RD\text{ Cost}(c_i) = \underbrace{\frac{2}{\sqrt{2}\,\sigma_{c_i}} \times \int_0^T s^2 \exp\left(-\frac{\sqrt{2}}{\sigma_{c_i}} s\right) ds}_{\text{Distortion}} + \qquad (17)$$

$$\underbrace{T^2 \frac{2}{\sqrt{2}\,\sigma_{c_i}} \times \int_T^{\infty} \exp\left(-\frac{\sqrt{2}}{\sigma_{c_i}} s\right) ds}_{\text{Rate}}$$

$$= \frac{\sigma_{c_i}^2}{2} - \frac{(\sigma_{c_i}^2 + \sqrt{2}\,\sigma_{c_i} T)}{2} \times$$

$$\exp\left(-\frac{\sqrt{2}}{\sigma_{c_i}} T\right)$$

Note that the variance for a transform coefficient $\sigma_{C_i}$ may be derived from the spatial variance of the video data as shown in Eq. (7). Further, a probabilistic rate-distortion cost for the video data can be calculated as the summation of the probabilistic RD costs of the transform coefficients as given by Eq. (17).

The formulation given in Eq. (17) may be used to compute a probabilistic rate-distribution cost for compressing video data x for an encoding mode. In video coding, x is generally residual data. In other words, some form of prediction is done to obtain the video data x. Therefore, the additional information sent to a receiver on how to obtain the residual data, i.e., the side information bits, may also be added to obtain a better rate distortion cost so that a fair decision between different encoding modes can be made. An R-D cost for each encoding mode may thus be determined as shown in Eq. (18).

$$\text{Rate-Distortion Cost} = \sum_{\forall i} \text{Prob. } RD \text{ Cost}(c_i) + \lambda_s \times (\text{Side info. bits}) \quad (18)$$

where $\lambda_s$ is the Lagrangian multiplier for the side information bits which can be determined experimentally. The side information bits may be the number of bits used for a motion vector in inter-coded blocks or the number of prediction bits encoded for intra-coded blocks. In one or more embodiments of the invention, rather than computing the estimated R-D cost as shown in Eq. (18), only the spatial variance is computed and a table look-up using the spatial variance and the transform coefficient threshold, i.e., the quantization threshold, may be performed to find the summation of the probabilistic R-D costs of transform coefficients needed for Eq. (18). More specifically, the summation of the probabilistic R-D costs of transform coefficients for the possible range of spatial variance values can be precomputed and the values provided in a look-up table.

In one or more embodiments of the invention, the distortion term in Eq. 18 can be used to estimate distortion of video data after compression as shown in Eq. (19).

$$\begin{aligned}\text{Prob. Distortion} &= \frac{2}{\sqrt{2}\,\sigma_{c_i}} \times \int_0^T s^2 \exp\!\left(-\frac{\sqrt{2}}{\sigma_{c_i}} s\right) ds \\ &= -\frac{\sigma_{c_i}^2}{4}\!\left(\exp\!\left(-\frac{\sqrt{2}}{\sigma_{c_i}}T\right)\!\times\!\left(\!\left(\frac{\sqrt{2}}{\sigma_{c_i}}T+1\right)^{\!2}+1\right)-2\right)\end{aligned} \quad (19)$$

Figure 9:
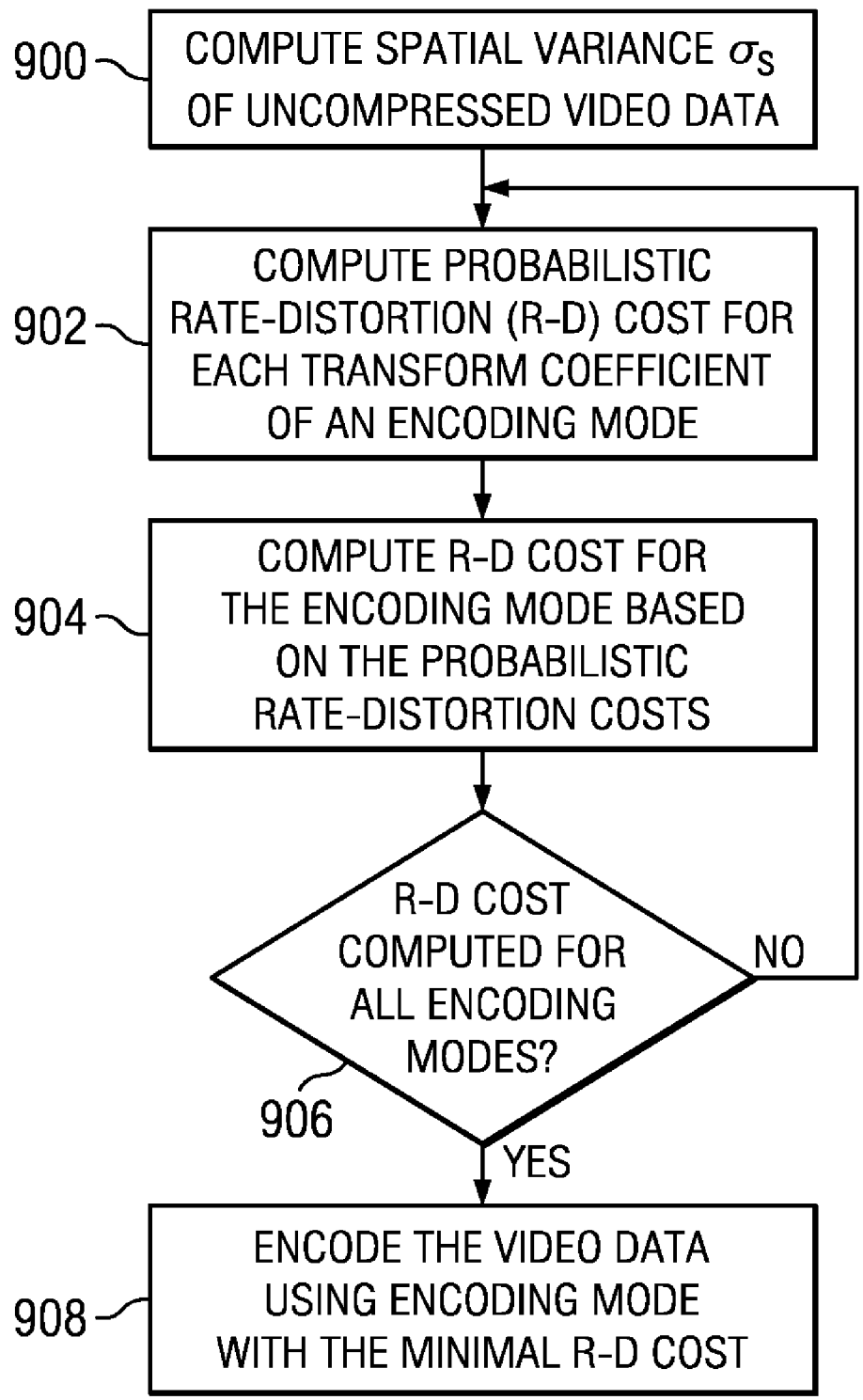
FIG. 9 shows a flow diagram of a method for video encoding in accordance with one or more embodiments of the invention.

FIG. 9 shows a method for video encoding in accordance with one or more embodiments of the invention. Initially, the spatial variance $\sigma_s$ of uncompressed video data in a block is computed (900). The block of video data may be a frame, a macroblock, or any other partitioning of the video data. Further, the spatial variance may be computed using any acceptable method for computing spatial variance, such as the method described in reference to FIG. 7. A rate-distortion (R-D) cost is then estimated for each possible encoding mode (902-906) based on the computed spatial variance. To compute R-D cost for an encoding mode, the probabilistic R-D cost for each transform coefficient of the encoding mode is computed as per Eq. (17) (902). The variance of each transform coefficient $\sigma_{c_i}$ may be derived from the spatial variance as shown in Eq. (7). The R-D cost for the encoding mode is then computed based on the probabilistic R-D costs of the transform coefficients as per Eq. (18) (904). After the R-D cost is computed for each encoding mode, the block of video data is encoded using the encoding mode with the minimal R-D cost.

The performance of the bit-rate estimation method of Eq. (12) and the performance of the R-D cost estimation method of Eq. (18) were tested using fifteen high definition (HD) video sequences of size 1920×1080 pixels. The HD sequences used represent different characteristics of video sequences that may be encountered in actual use. Some of the sequences have high motion and textural details while others have more static content. Some of the sequences are also noisy. The test-bed used to evaluate the performance was the mode decision part of the JM 14.0 reference code of H.264.

To test the accuracy the bit-rate estimation method, both an implementation of the bit-rate estimation method and the rho domain method were integrated into the H.264 JM 14.0 encoder by replacing the brute-force rate calculation routine used in the H.264 rate-distortion optimized (RDO) mode decision with the implementation of the bit-rate estimation method and the implementation of the rho domain rate estimation method.

Figure 10:
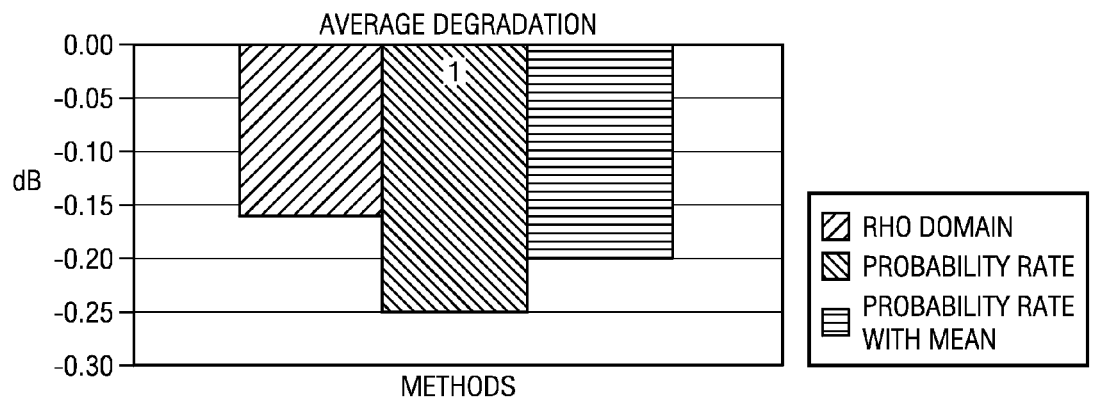
FIGS. 10 and 11 show performance comparison graphs in accordance with one or more embodiments of the invention.
Figure 11:
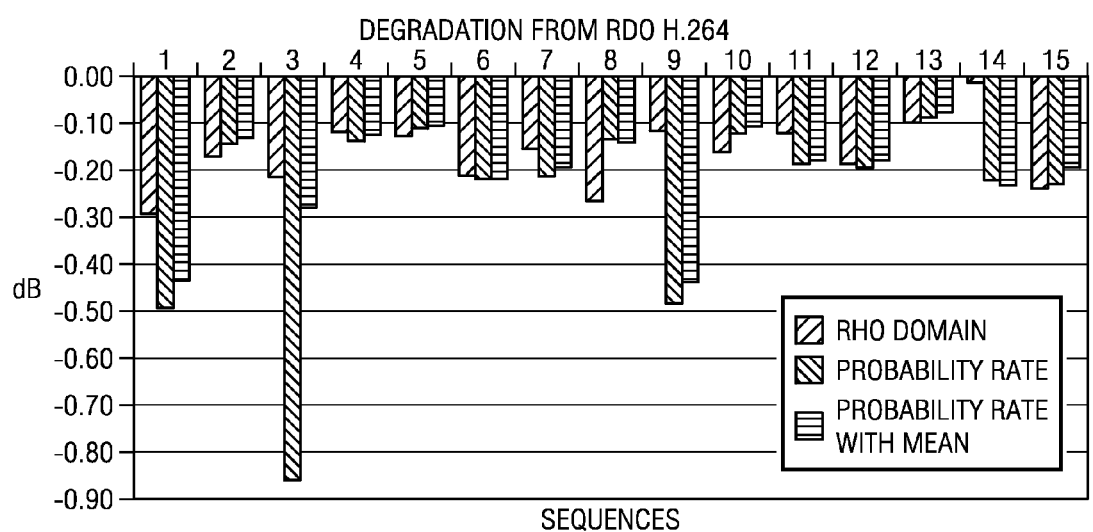
Figure 12A:
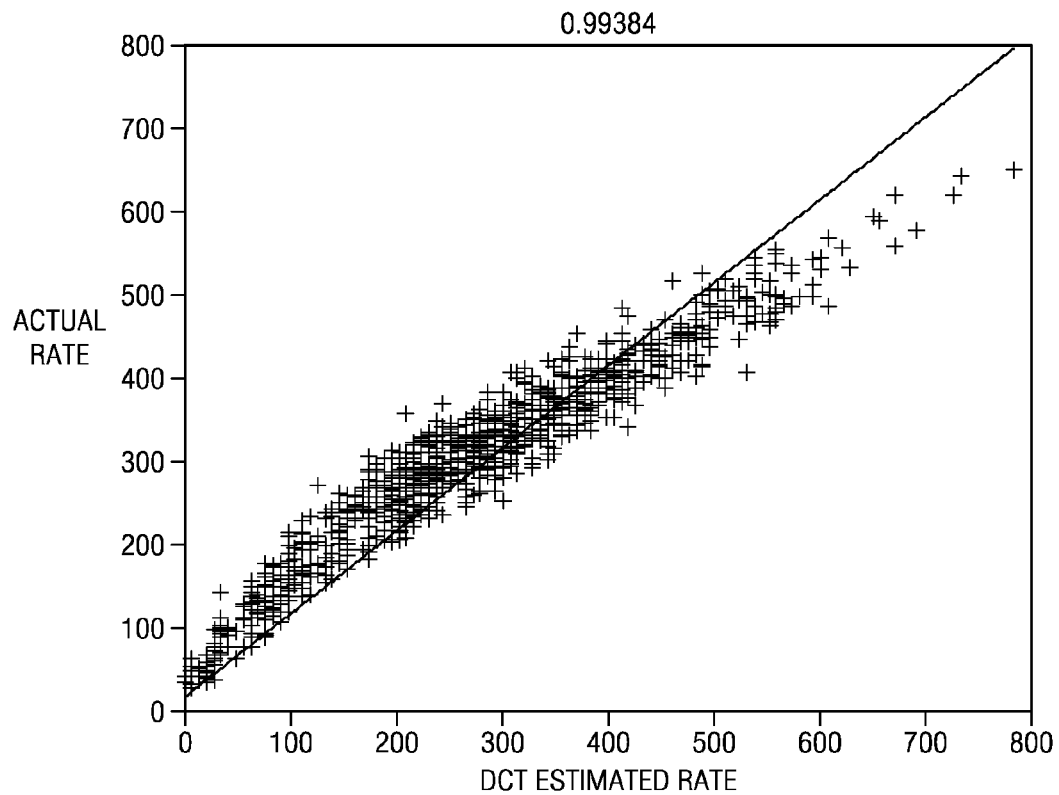
FIGS. 12A and 12B show graphs of the correlation between actual bit-rates and estimated bit-rates in accordance with one or more embodiments of the invention.
Figure 12B:
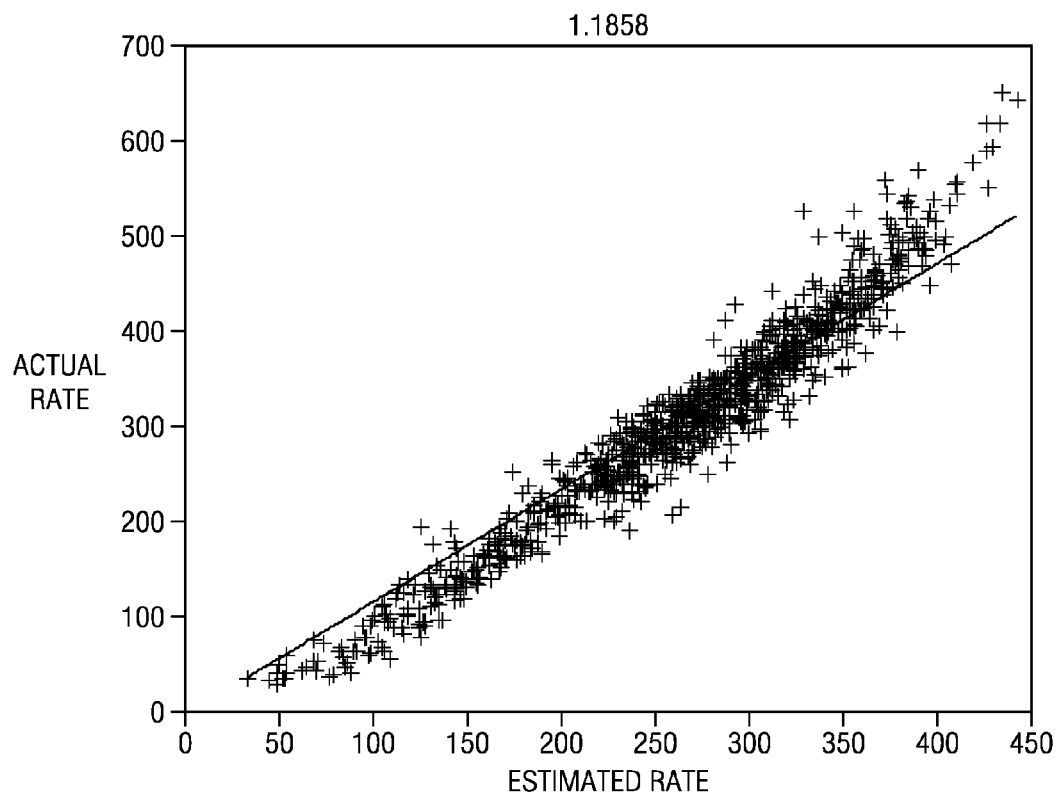

The results of the performance testing are shown in FIG. 10 and FIG. 11. These results show that the bit-rate estimation method yielded an average of 0.20 dB (peak 0.4 dB) quality loss as compared to the brute-force calculation. The results also show that the performance of the bit-rate estimation method is very close to rho domain rate estimation method. Finally, the results also show that the rho domain rate estimation method underperformed the brute-force calculation 0.16 dB on average. As shown in FIG. 10, the addition of using mean information as per Eq. (13) gives 0.05 dB better results on average. Similarly, worst case degradation was reduced from 0.85 dB to 0.4 dB when Eq. (13) was used. FIGS. 12A and 12B illustrate the correlation between the actual bit-rate and estimated bit rates for the rho-domain method (FIG. 12A) and the bit-rate estimation method (FIG. 12B). For these tests, $\phi$, m and v in Eq. 13 were set as 7, 7, and 10, respectively.

Figure 13A:
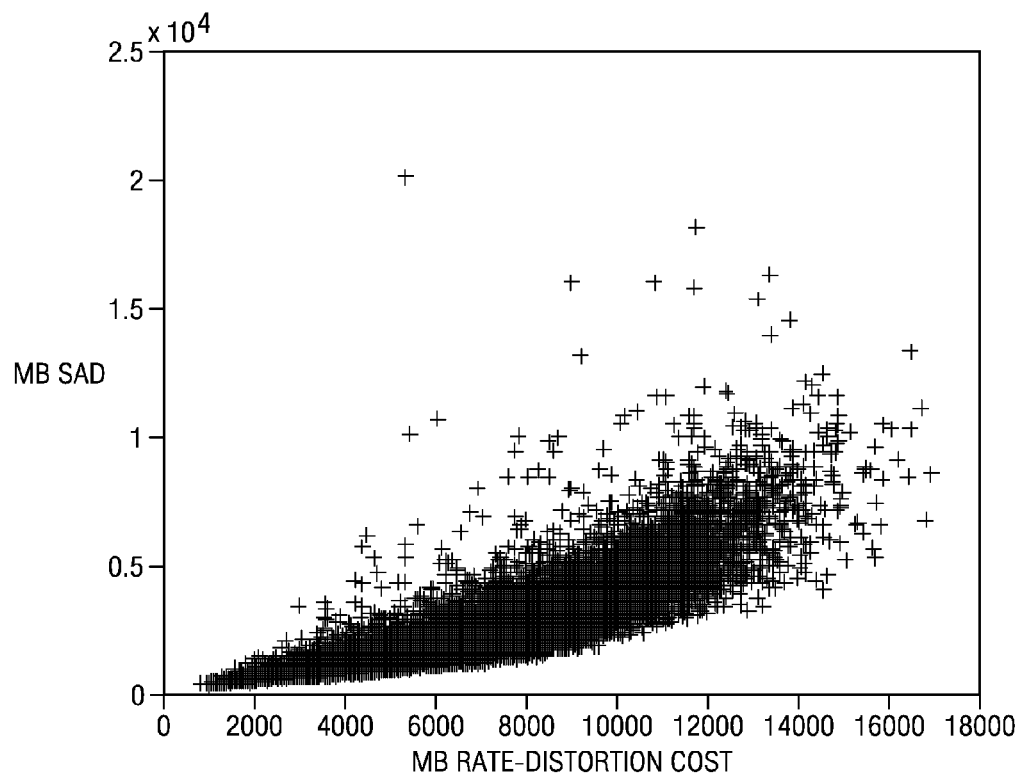
FIGS. 13A-13C show graphs of the correlation between actual rate-distortion cost of a macroblock and, respectively, SAD of the macroblock, variance of the macroblock, and estimated rate-distortion cost in accordance with one or more embodiments of the invention.
Figure 13B:
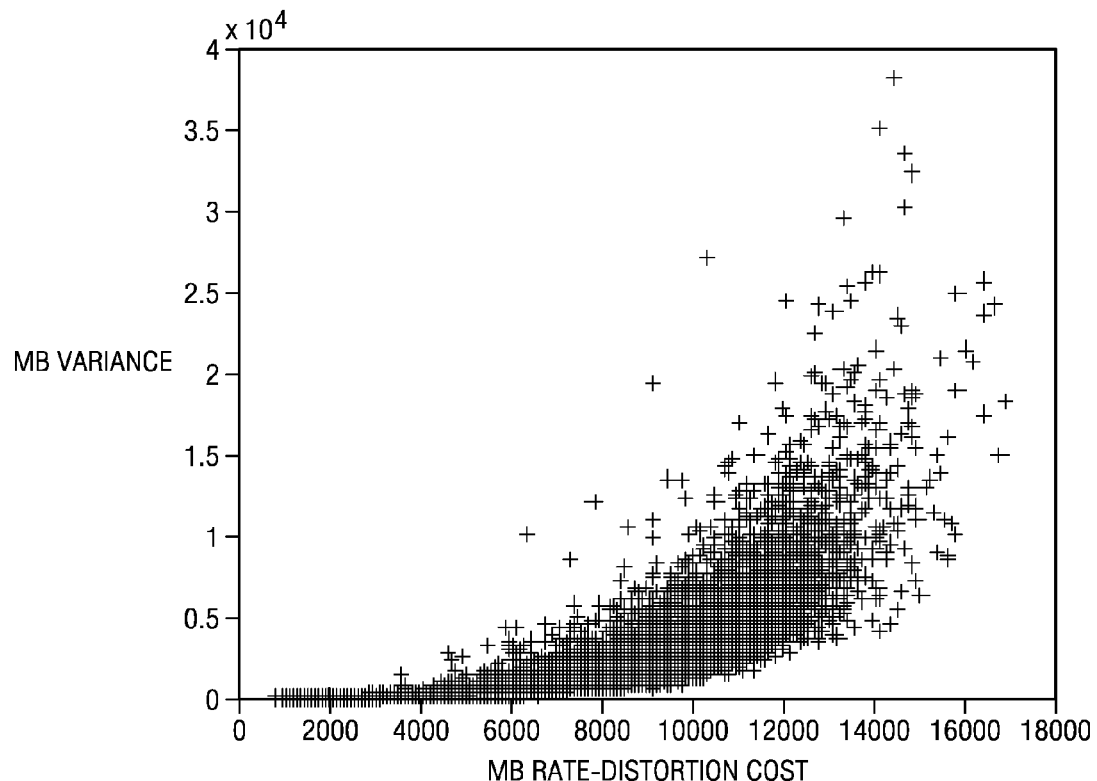
Figure 13C:
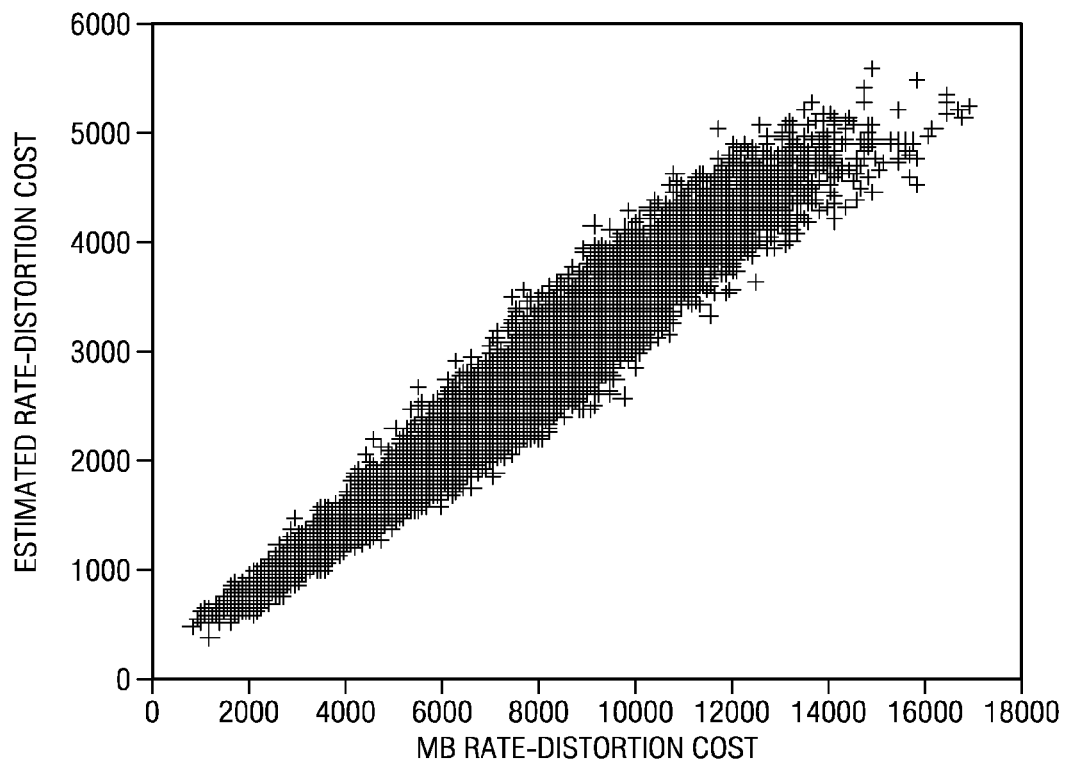

To evaluate the performance of the rate-distortion estimation method, some of the previously mentioned video sequences were encoded using the method. The actual R-D cost for macroblocks in the video sequences was also determined using the H.264 JM 14.0 encoder. In addition, the actual SAD (sum of absolute differences) of the macroblocks in the video sequences and the spatial variances of the macroblocks was determined. FIG. 13A shows the correlation between the actual rate-distortion cost of a macroblock and the macroblock SAD. FIG. 13B shows the correlation between the actual rate-distortion cost and the macroblock spatial variance. FIG. 13C shows the correlation between the actual rate distortion cost and the rate-distortion cost estimated as per Eq. (18).

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. In some cases, the software may also be sold in a computer program product, which includes the computer-readable medium and packaging materials for the computer-readable medium.

Figure 16:
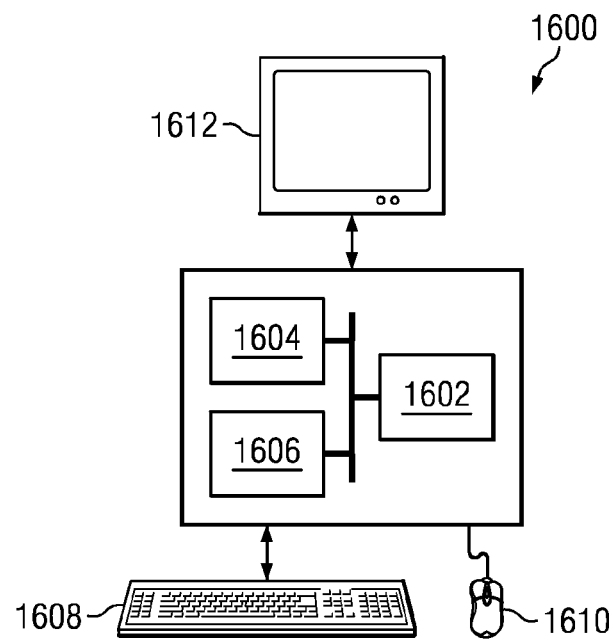
FIGS. 14-16 show illustrative digital systems in accordance with one or more embodiments of the invention.
Figure 14:
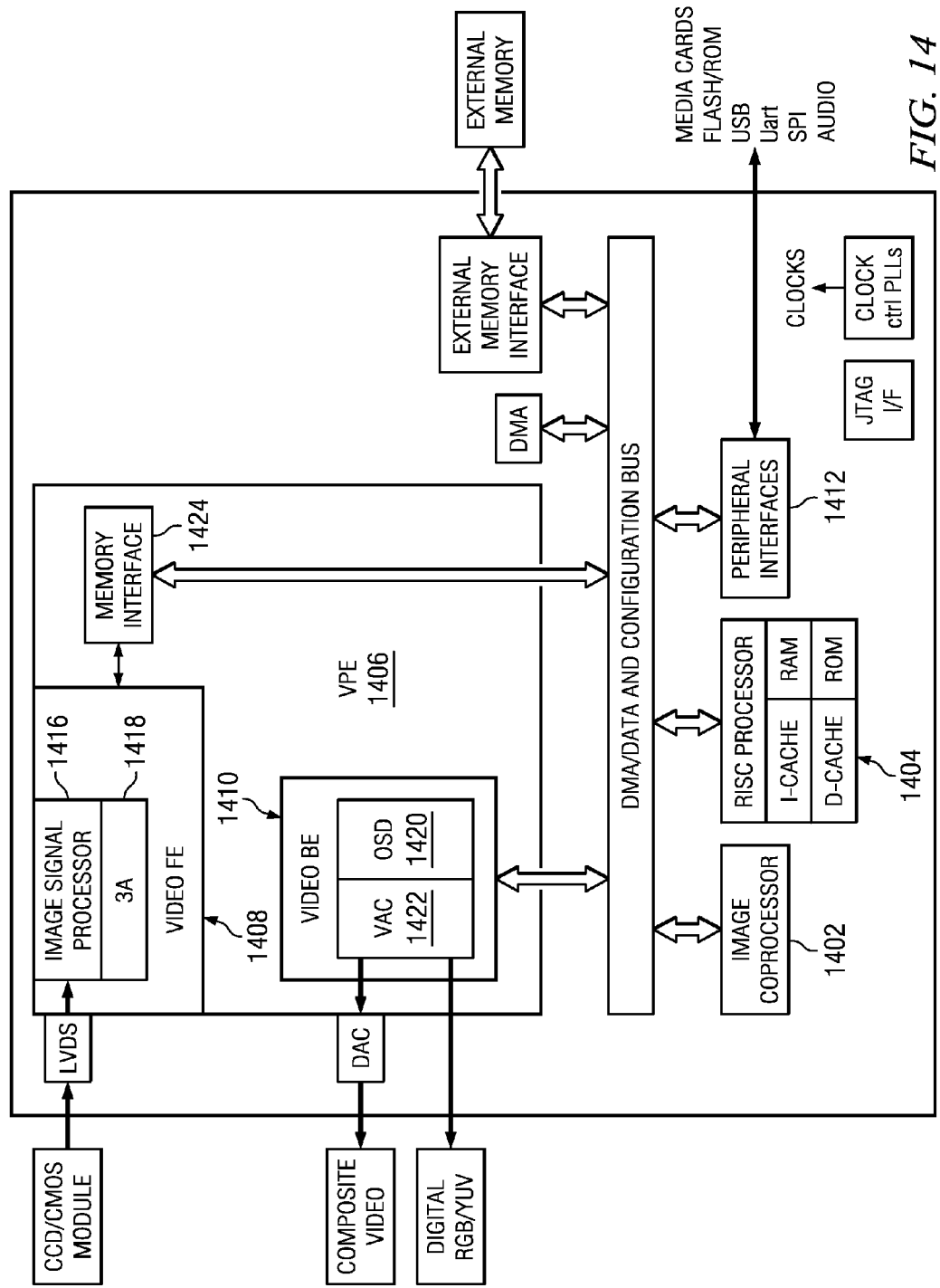
Figure 15:
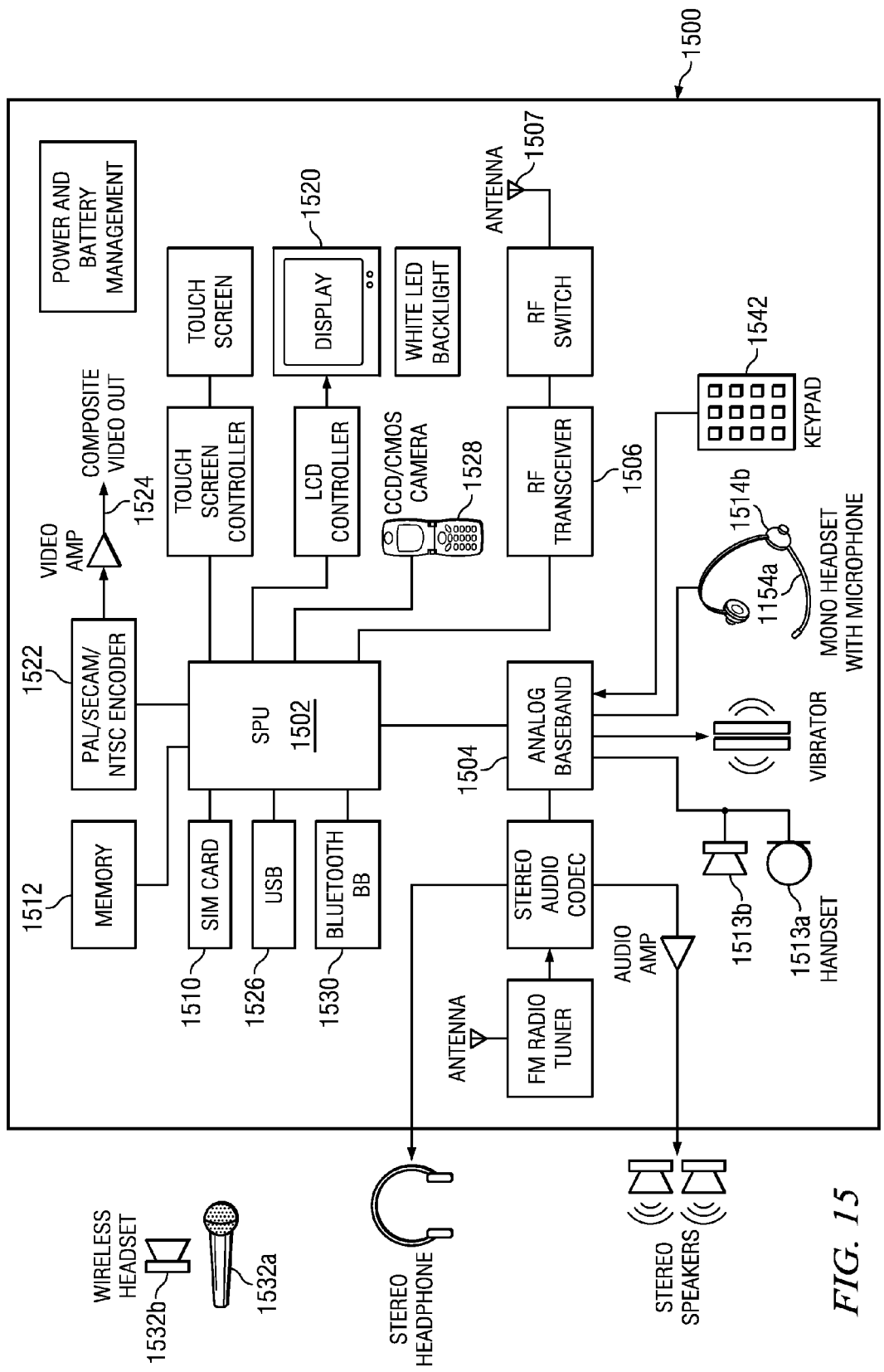

Embodiments of the methods and video encoders for performing bit-rate estimation and/or rate-distortion cost estimation as described herein may be implemented for virtually any type of digital system (e.g., a desk top computer, a laptop computer, a handheld device such as a mobile (i.e., cellular) phone, a personal digital assistant, a digital camera, etc.) with functionality to capture digital video images. FIGS. 14-16 show block diagrams of illustrative digital systems.

FIG. 14 shows a digital system suitable for an embedded system (e.g., a digital camera) in accordance with one or more embodiments of the invention that includes, among other components, a DSP-based image coprocessor (ICP) (1402), a RISC processor (1404), and a video processing engine (VPE) (1406) that may be configured to perform the bit-rate estimation method and/or the rate-distortion cost estimation method described herein. The RISC processor (1404) may be any suitably configured RISC processor. The VPE (1406) includes a configurable video processing front-end (Video FE) (1408) input interface used for video capture from imaging peripherals such as image sensors, video decoders, etc., a configurable video processing back-end (Video BE) (1410) output interface used for display devices such as SDTV displays, digital LCD panels, HDTV video encoders, etc, and memory interface (1424) shared by the Video FE (1408) and the Video BE (1410). The digital system also includes peripheral interfaces (1412) for various peripherals that may include a multi-media card, an audio serial port, a Universal Serial Bus (USB) controller, a serial port interface, etc.

The Video FE (1408) includes an image signal processor (ISP) (1416), and a 3A statistic generator (3A) (1418). The ISP (1416) provides an interface to image sensors and digital video sources. More specifically, the ISP (1416) may accept raw image/video data from a sensor (CMOS or CCD) and can accept YUV video data in numerous formats. The ISP (1416) also includes a parameterized image processing module with functionality to generate image data in a color format (e.g., RGB) from raw CCD/CMOS data. The ISP (1416) is customizable for each sensor type and supports video frame rates for preview displays of captured digital images and for video recording modes. The ISP (1416) also includes, among other functionality, an image resizer, statistics collection functionality, and a boundary signal calculator. The 3A module (1418) includes functionality to support control loops for auto focus, auto white balance, and auto exposure by collecting metrics on the raw image data from the ISP (1416) or external memory. In one or more embodiments of the invention, the Video FE (1408) is configured to perform at least one of the methods for contrast enhancement as described herein.

The Video BE (1410) includes an on-screen display engine (OSD) (1420) and a video analog encoder (VAC) (1422). The OSD engine (1420) includes functionality to manage display data in various formats for several different types of hardware display windows and it also handles gathering and blending of video data and display/bitmap data into a single display window before providing the data to the VAC (1422) in YCbCr format. The VAC (1422) includes functionality to take the display frame from the OSD engine (1420) and format it into the desired output format and output signals required to interface to display devices. The VAC (1422) may interface to composite NTSC/PAL video devices, S-Video devices, digital LCD devices, high-definition video encoders, DVI/HDMI devices, etc.

The memory interface (1424) functions as the primary source and sink to modules in the Video FE (1408) and the Video BE (1410) that are requesting and/or transferring data to/from external memory. The memory interface (1424) includes read and write buffers and arbitration logic.

The ICP (1402) includes functionality to perform the computational operations required for compression and other processing of captured images. The video compression standards supported may include one or more of the JPEG standards, the MPEG standards, and the H.26x standards. In one or more embodiments of the invention, the ICP (1402) is configured to perform the computational operations of the methods described herein.

In operation, to capture an image or video sequence, video signals are received by the video FE (1408) and converted to the input format needed to perform video compression. Prior to the compression, one of the methods for adaptive equalization or local contrast enhancement may be applied as part of processing the captured video data. The video data generated by the video FE (1408) is stored in the external memory. The video data is then encoded, i.e., compressed. During the compression process, the video data is read from the external memory and the compression computations on this video data are performed by the ICP (1402). The resulting compressed video data is stored in the external memory. The compressed video data is then read from the external memory, decoded, and post-processed by the video BE (1410) to display the image/video sequence.

FIG. 15 is a block diagram of a digital system (e.g., a mobile cellular telephone) (1500) that may be configured to perform the methods described herein. The signal processing unit (SPU) (1502) includes a digital processing processor system (DSP) that includes embedded memory and security features. The analog baseband unit (1504) receives a voice data stream from handset microphone (1513a) and sends a voice data stream to the handset mono speaker (1513b). The analog baseband unit (1504) also receives a voice data stream from the microphone (1514a) and sends a voice data stream to the mono headset (1514b). The analog baseband unit (1504) and the SPU (1502) may be separate ICs. In many embodiments, the analog baseband unit (1504) does not embed a programmable processor core, but performs processing based on configuration of audio paths, filters, gains, etc being setup by software running on the SPU (1502). In some embodiments, the analog baseband processing is performed on the same processor and can send information to it for interaction with a user of the digital system (1500) during a call processing or other processing.

The display (1520) may also display pictures and video streams received from the network, from a local camera (1528), or from other sources such as the USB (1526) or the memory (1512). The SPU (1502) may also send a video stream to the display (1520) that is received from various sources such as the cellular network via the RF transceiver (1506) or the camera (1526). The SPU (1502) may also send a video stream to an external video display unit via the encoder (1522) over a composite output terminal (1524). The encoder unit (1522) may provide encoding according to PAL/SECAM/NTSC video standards.

The SPU (1502) includes functionality to perform the computational operations required for video compression and decompression. The video compression standards supported may include, for example, one or more of the JPEG standards, the MPEG standards, and the H.26x standards. In one or more embodiments of the invention, the SPU (1502) is configured to perform the computational operations of one or more of the methods described herein. Software instructions implementing the one or more methods may be stored in the memory (1512) and executed by the SPU (1502) during encoding of video sequences.

FIG. 16 shows a digital system (1600) (e.g., a personal computer) that includes a processor (1602), associated memory (1604), a storage device (1606), and numerous other elements and functionalities typical of digital systems (not shown). In one or more embodiments of the invention, a digital system may include multiple processors and/or one or more of the processors may be digital signal processors. The digital system (1600) may also include input means, such as a keyboard (1608) and a mouse (1610) (or other cursor control device), and output means, such as a monitor (1612) (or other display device). The digital system (1600) may also include an image capture device (not shown) that includes circuitry (e.g., optics, a sensor, readout electronics) for capturing video sequences. The digital system (1600) may be connected to a network (1614) (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (1600) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be distributed to the digital system (1600) via removable memory (e.g., floppy disk, optical disk, flash memory, USB key), via a transmission path, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

It is therefore contemplated that the appended claims will cover any such modifications of the embodiments as fall within the true scope and spirit of the invention.

What is claimed is:

1. A computer-implemented method of video encoding comprising:
   computing spatial variance for video data in a block of a video sequence;
   estimating a first bit-rate based on the spatial variance, a transform coefficient threshold, and variance multiplicative factors empirically determined for first transform coefficients; and
   encoding the block based on the first bit-rate; wherein estimating a first bit-rate comprises estimating the first bit-rate as a value given by $$\varphi \times \sum_i \exp\left(-\frac{\sqrt{2}\,T_i}{\sigma_{spatial}}\right)$$

wherein $\varphi$ is a number of bits for encoding the first transform coefficients, $T_i$ is a ratio of the transform coefficient threshold and a variance multiplicative factor of the variance multiplicative factors for the ith first transform coefficient, and $\sigma$ is the spatial variance.

2. The computer-implemented method of claim 1, further comprising estimating distortion as a value given by $$-\frac{\sigma_{c_i}^2}{4}\left(\exp\left(-\frac{\sqrt{2}}{\sigma_{c_i}}T\right) \times \left(\left(\frac{\sqrt{2}}{\sigma_{c_i}}T+1\right)^2 + 1\right) - 2\right)$$

wherein T is the transform coefficient threshold, and $\sigma_{C_i}$ is variance of an ith first transform coefficient, and wherein $\sigma_{C_i}$ is estimated based on the spatial variance.

3. The computer-implemented method of claim 1, further comprising:
   estimating a second bit-rate for the block based on the spatial variance, the transform coefficient threshold, and variance multiplicative factors empirically determined for second transform coefficients, and
   wherein encoding the block comprises selecting an encoding mode based on the first bit-rate and the second bit-rate.

4. The computer-implemented method of claim 1, further comprising:
   estimating first distortion for the block based on the spatial variance, the transform coefficient threshold, and the variance multiplicative factors empirically determined for the first transform coefficients; and
   estimating a first rate-distortion cost using the first bit-rate and the first distortion.

5. The computer-implemented method of claim 4, further comprising:
   estimating a second bit-rate and second distortion for the block based on the spatial variance, the transform coefficient threshold, and variance multiplicative factors empirically determined for second transform coefficients; and
   estimating a second rate-distortion cost using the second bit-rate and the second distortion,
   wherein encoding the block comprises selecting an encoding mode based on the first rate-distortion cost and the second rate-distortion cost.

6. The computer-implemented method of claim 4, wherein estimating first distortion and estimating a first bit-rate are performed by estimating a probabilistic rate-distortion cost for each transform coefficient of the first transform coefficients based on the transform coefficient threshold, the spatial variance, and the variance multiplicative factors empirically determined for the first transform coefficients.

7. The computer-implemented method of claim 6, wherein estimating a probabilistic rate-distortion cost comprises estimating the probabilistic rate-distortion cost as a value given by $$\frac{\sigma_{c_i}^2}{2} - \frac{\left(\sigma_{c_i}^2 + \sqrt{2}\,\sigma_{c_i}T\right)}{2} \times \exp\left(-\frac{\sqrt{2}}{\sigma_{c_i}}T\right)$$

wherein T is the transform coefficient threshold and $\sigma_{C_i}$ is variance of an ith first transform coefficient, and wherein $\sigma_{C_i}$ is estimated based on the spatial variance.

8. The computer-implemented method of claim 7, wherein estimating a first rate-distortion cost comprises estimating the first rate-distortion cost as a summation of the probabilistic rate-distortion costs for the first transform coefficients added to the product of a number of side information bits and a Lagrangian multiplier for the side information bits.

9. A digital system comprising:
a video encoder configured to encode a block of a video sequence by computing spatial variance for video data in a block of a video sequence;
estimating a first bit-rate based on the spatial variance, a transform coefficient threshold, and variance multiplicative factors empirically determined for first transform coefficients; and
encoding the block based on the first bit-rate; wherein estimating a first bit-rate comprises estimating the first bit-rate as a value given by $$\varphi \times \sum_i \exp\left(-\frac{\sqrt{2}\, T_i}{\sigma_{spatial}}\right)$$

wherein $\varphi$ is a number of bits for encoding the first transform coefficients, $T_i$ is a ratio of the transform coefficient threshold and a variance multiplicative factor of the variance multiplicative factors for the ith first transform coefficient, and $\sigma$ is the spatial variance.

10. The digital system of claim 9, wherein the video encoder is further configured to encode a block of a video sequence by
estimating distortion as a value given by $$-\frac{\sigma_{c_i}^2}{4}\left(\exp\left(-\frac{\sqrt{2}}{\sigma_{c_i}}T\right) \times \left(\left(\frac{\sqrt{2}}{\sigma_{c_i}}T+1\right)^2 + 1\right) - 2\right)$$

wherein T is the transform coefficient threshold, and $\sigma_{C_i}$ is variance of an ith first transform coefficient, and wherein $\sigma_{C_i}$ is estimated based on the spatial variance.

11. The digital system of claim 9, wherein the video encoder is further configured to encode a block of a video sequence by
estimating a second bit-rate for the block based on the spatial variance, the transform coefficient threshold, and variance multiplicative factors empirically determined for second transform coefficients, and
wherein encoding the block comprises selecting an encoding mode based on the first bit-rate and the second-bit rate.

12. The digital system of claim 9, wherein the video encoder is further configured to encode a block of a video sequence by
estimating first distortion for the block based on the spatial variance, the transform coefficient threshold, and the variance multiplicative factors empirically determined for the first transform coefficients; and
estimating a first rate-distortion cost using the first bit-rate and the first distortion.

13. The digital system of claim 12, further comprising:
estimating a second bit-rate and second distortion for the block based on the spatial variance, the transform coefficient threshold, and variance multiplicative factors empirically determined for second transform coefficients; and estimating a second rate-distortion cost using the second bit-rate and the second distortion,
wherein encoding the block comprises selecting an encoding mode based on the first rate-distortion cost and the second rate-distortion cost.

14. The digital system of claim 12, wherein estimating first distortion and estimating a first bit-rate are performed by estimating a probabilistic rate-distortion cost for each transform coefficient of the first transform coefficients based on the transform coefficient threshold, the spatial variance, and variance multiplicative factors empirically determined for the first transform coefficients.

15. The digital system of claim 14, wherein estimating a probabilistic rate-distortion cost comprises estimated the probabilistic rate-distortion cost as a value given by $$\frac{\sigma_{c_i}^2}{2} - \frac{(\sigma_{c_i}^2 + \sqrt{2}\,\sigma_{c_i} T)}{2} \times \exp\left(-\frac{\sqrt{2}}{\sigma_{c_i}}T\right)$$

wherein T is the transform coefficient threshold and $\sigma_{C_i}$ is variance of an ith first transform coefficient, and wherein $\sigma_{C_i}$ is estimated based on the spatial variance.

16. The digital system of claim 15, wherein estimating a first rate-distortion cost comprises estimating the first rate-distortion cost as a summation of the probabilistic rate-distortion costs for the first transform coefficients added to the product of a number of side information bits and a Lagrangian multiplier for the side information bits.

17. A non-transitory computer readable medium comprising executable instructions to cause a digital system to perform a method of video encoding, the method comprising:
computing spatial variance for video data in a block of a video sequence;
estimating a first rate-distortion cost for a first encoding mode by estimating a probabilistic rate-distortion cost for each transform coefficient of first transform coefficients based on the spatial variance, a transform coefficient threshold, and variance multiplicative factors empirically determined for the first transform coefficients;
estimating a second rate-distortion cost for a second encoding mode by estimating a probabilistic rate-distortion cost for each transform coefficient of second transform coefficients based on the spatial variance, the transform coefficient threshold, and variance multiplicative factors empirically determined for the second transform coefficients; and
encoding the block using the first encoding mode when the first rate-distortion cost is less than the second rate-distortion cost.

18. The computer readable medium of claim 17, wherein estimating a first rate-distortion cost comprises estimating the first rate-distortion cost as a summation of the probabilistic rate-distortion costs for the first transform coefficients added to the product of a number of side information bits and a Lagrangian multiplier for the side information bits.

* * * * *